(12) United States Patent
Smith et al.

(10) Patent No.: US 11,617,473 B2
(45) Date of Patent: Apr. 4, 2023

(54) GRINDING APPARATUS

(71) Applicant: Rhiza Irrigation Ltd., Burnaby (CA)

(72) Inventors: Kiyoshi Smith, Burnaby (CA); Kenji Smith, Burnaby (CA); Seiji Smith, Burnaby (CA)

( * ) Notice: Subject to any disclaimer, the term of this patent is extended or adjusted under 35 U.S.C. 154(b) by 33 days.

(21) Appl. No.: 16/969,285

(22) PCT Filed: Feb. 12, 2019

(86) PCT No.: PCT/CA2019/050173
§ 371 (c)(1),
(2) Date: Aug. 12, 2020

(87) PCT Pub. No.: WO2019/157591
PCT Pub. Date: Aug. 22, 2019

(65) Prior Publication Data
US 2021/0007555 A1    Jan. 14, 2021

(30) Foreign Application Priority Data

Feb. 13, 2018   (CA) .................................. CA 2994887

(51) Int. Cl.
| | |
|---|---|
| A47J 42/30 | (2006.01) |
| A47J 42/24 | (2006.01) |
| A47J 42/38 | (2006.01) |
| A24B 3/18 | (2006.01) |
| A24B 5/16 | (2006.01) |

(52) U.S. Cl.
CPC .............. *A47J 42/30* (2013.01); *A47J 42/24* (2013.01)

(58) Field of Classification Search
CPC . A47J 42/30; A47J 42/24; A47J 42/38; A24B 3/18; A24B 5/16
See application file for complete search history.

(56) References Cited

U.S. PATENT DOCUMENTS

| | | | |
|---|---|---|---|
| 9,521,929 B1* | 12/2016 | Raphael | ............... B02C 18/186 |
| 9,757,733 B1* | 9/2017 | Dukat | ..................... A47J 42/40 |
| 2012/0168544 A1 | 7/2012 | Chaoui et al. | |

(Continued)

FOREIGN PATENT DOCUMENTS

| | | | |
|---|---|---|---|
| CN | 203244998 U | * | 10/2013 |
| CN | 203244998 U | | 10/2013 |

OTHER PUBLICATIONS

English translate (CN203244998U), retrieved date Nov. 6, 2021.*

*Primary Examiner* — Matthew Katcoff
*Assistant Examiner* — Mohammed S. Alawadi
(74) *Attorney, Agent, or Firm* — Andrews Robichaud PC; Alessandro Colonnier

(57) ABSTRACT

The present disclosure describes a grinding apparatus preferably comprised of upper, central and lower bodies that are magnetically connected to one another. The central body is further comprised of cutting edges positioned on a center portion to cut and evacuate herbs. The upper body is comprised of outer grinding teeth that can cut and grind herbs trapped proximate an outer rim of the central body. Inner grinding teeth positioned on the upper body and having curved inner faces abut against a correspondingly cylindrical member of the central body to limit the radial play between the upper and central bodies during operation. A teeth or gear system is also disclosed to provide torque transfer and facilitate the connection between the central and lower bodies.

20 Claims, 33 Drawing Sheets

(56) References Cited

U.S. PATENT DOCUMENTS

| | | | |
|---|---|---|---|
| 2013/0026269 A1* | 1/2013 | Pai | A47J 42/40 |
| | | | 241/285.3 |
| 2014/0217213 A1* | 8/2014 | Edwards | A47J 42/38 |
| | | | 241/91 |
| 2014/0353412 A1* | 12/2014 | Grumbacher | A24C 5/40 |
| | | | 241/70 |
| 2016/0106262 A1* | 4/2016 | Mroue | B02C 23/10 |
| | | | 241/79 |
| 2017/0135524 A1* | 5/2017 | Moneta | A47J 42/24 |
| 2017/0319009 A1 | 11/2017 | Seckel et al. | |
| 2018/0126386 A1* | 5/2018 | Witko | B02C 18/16 |
| 2018/0271327 A1 | 9/2018 | Haskins | |

* cited by examiner

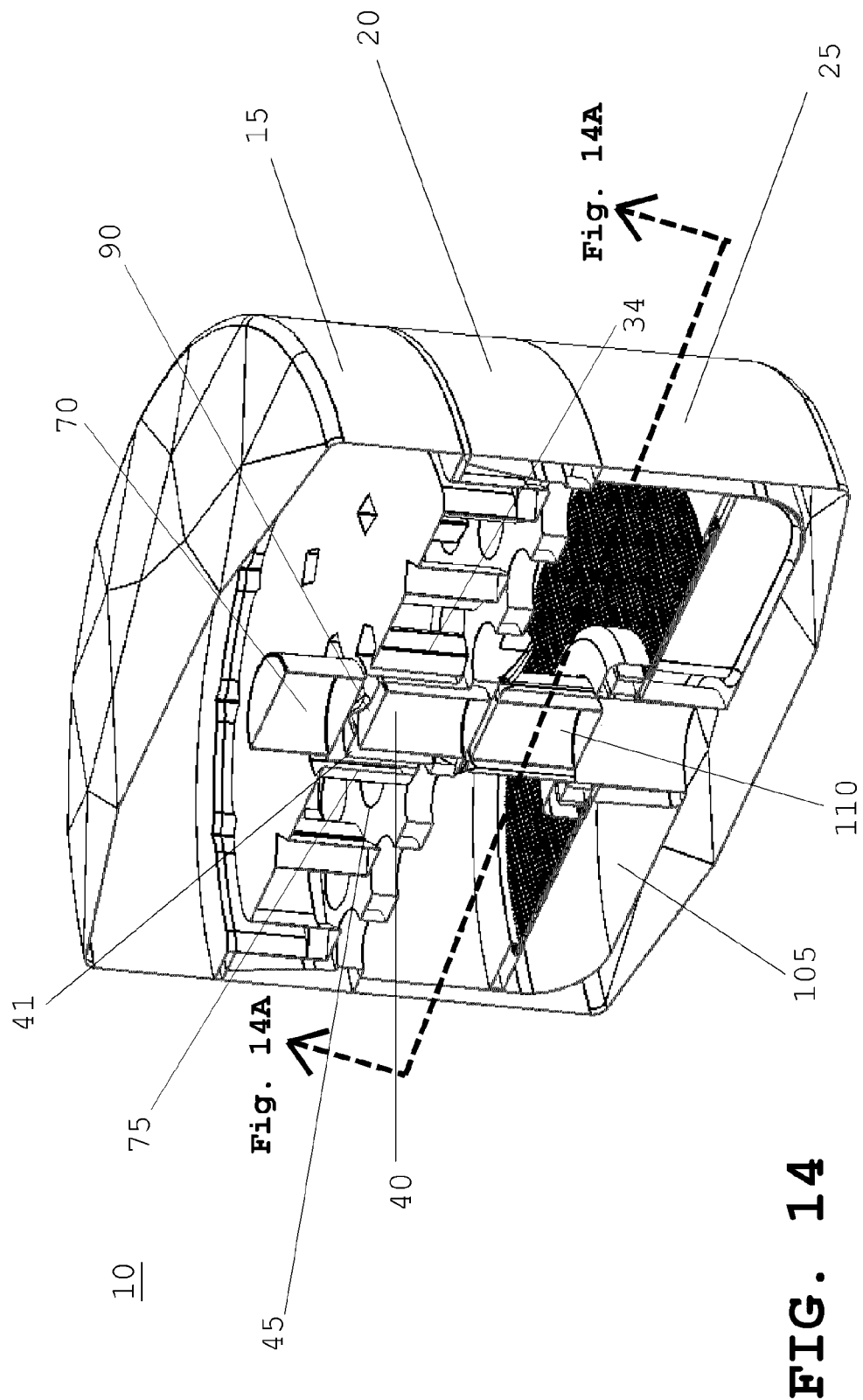

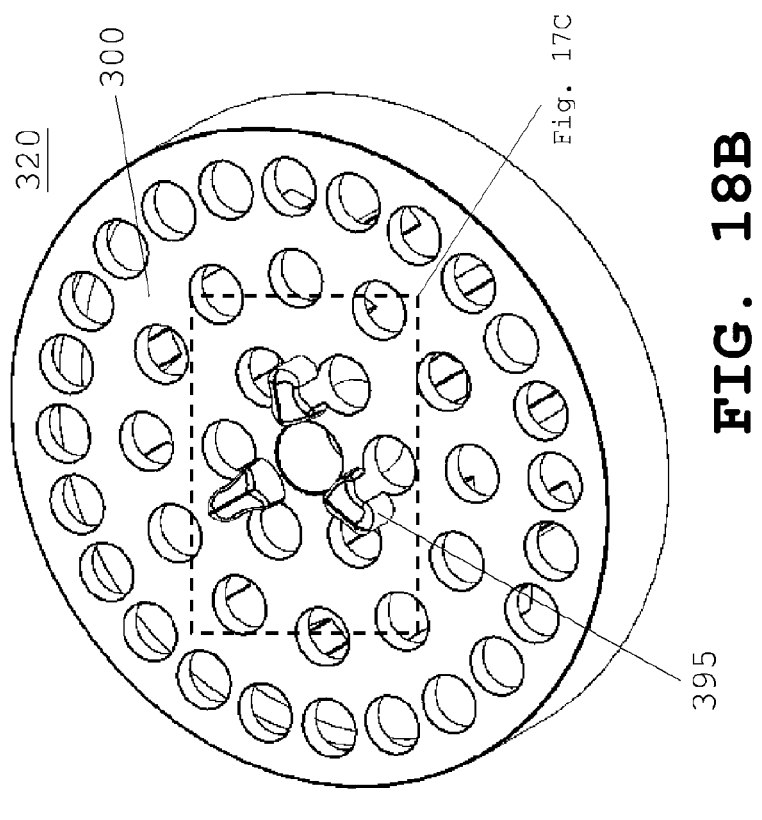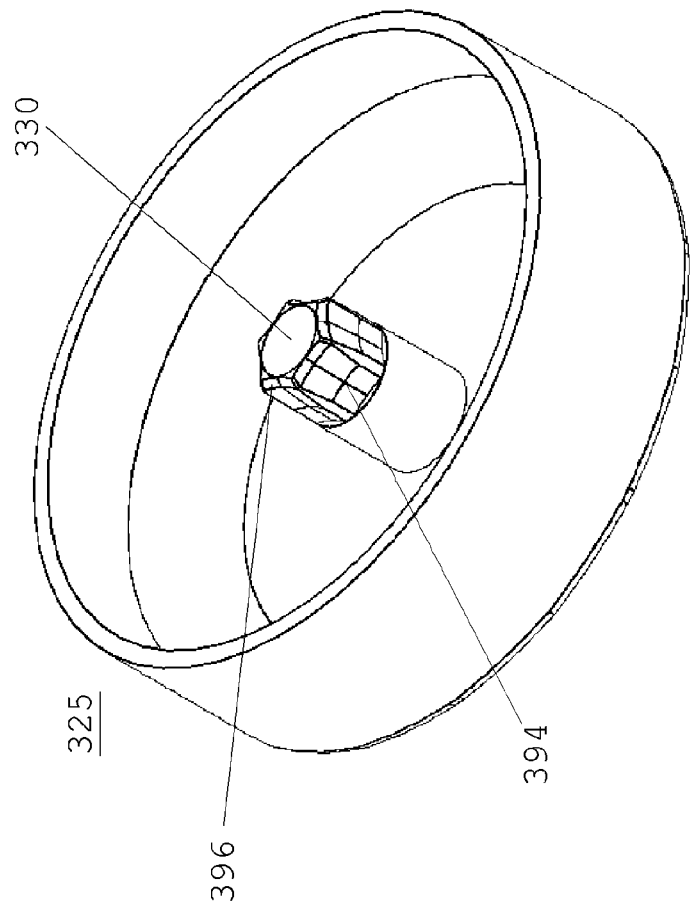
FIG. 18A
FIG. 18B

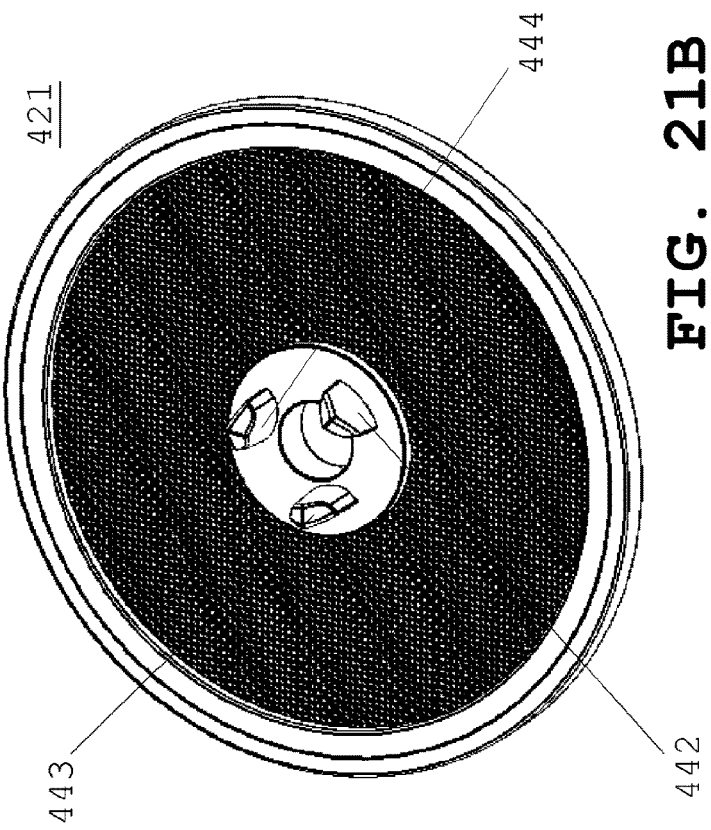
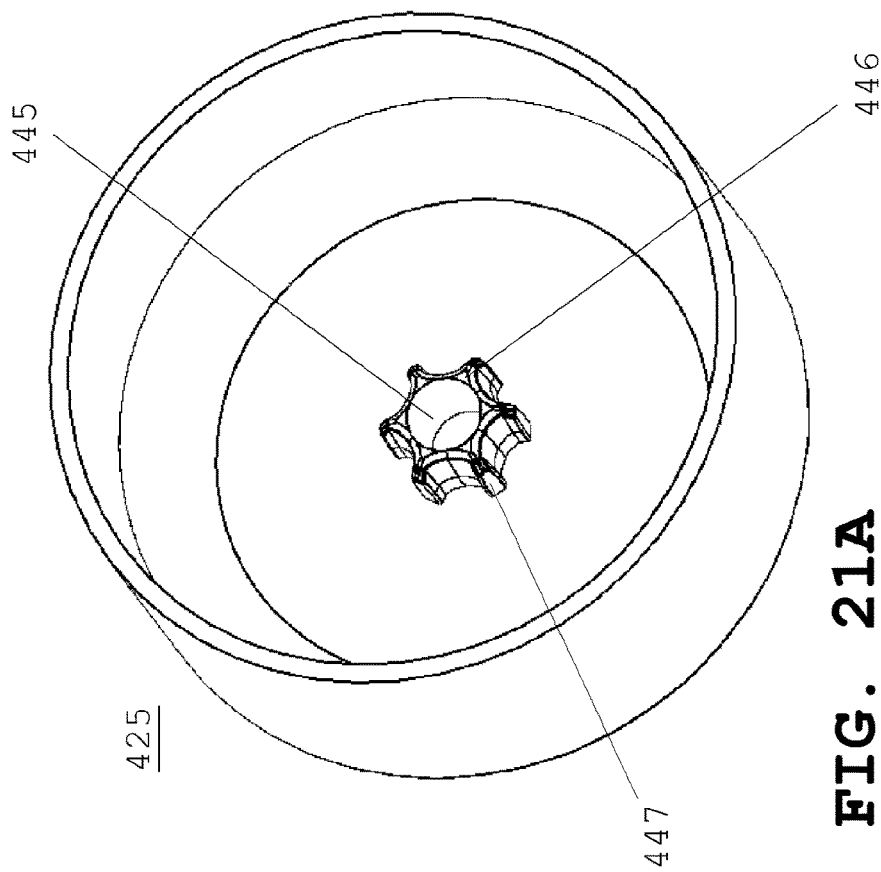
FIG. 21B
FIG. 21A

GRINDING APPARATUS

FIELD

The present disclosure relates to the field of grinders, and more specifically to a mechanical grinder for herbs.

BACKGROUND

Herb grinders have been around for many decades. They grind various herbs, and some of these herbs contain oil and sticky residue. Devices as described in U.S. Pat. No. 8,393,563 (Chaoui) and US Patent Publication No. 2014/0217213 (Edwards) have attempted to address some of the issues with herb grinders. Unfortunately, many problems persist. Specifically, after repeated usage, residue from the herbs builds up and interferes with the function of the grinder. The effects include complete jamming, which makes the grinder inoperable, and partial jamming, which makes the rotational movement required to grind very difficult. This requires the user to constantly clean the herb grinder to ensure optimal performance. Therefore, there is a need for a non-jamming, low-friction, magnetically axially aligned herb grinder with a self-cleaning center pivot to overcome the shortcomings of the prior art.

SUMMARY

The present disclosure provides a grinding apparatus to grind herbs comprising an upper body comprising upper grinding teeth; a central body axially aligned with and rotatably connected to the upper body, the central body further comprising: central grinding teeth cooperating with the upper grinding teeth to grind the herbs; angular guides; and, at least one evacuating aperture; and, a lower body axially aligned with and secured to the central body, the lower body further comprised of: a cavity to receive the herbs; and, locking members to engage the angular guides of the central body and provide the proper axial alignment between the lower body and the central body, wherein the upper body is in magnetic engagement with and can be rotated independently from the central body and the central body in magnetic engagement to the lower body.

BRIEF DESCRIPTION OF THE DRAWINGS

The following figures serve to illustrate various embodiments of features of the disclosure. These figures are illustrative and are not intended to be limiting.

FIG. 14 is a cross-sectional perspective view of the assembled grinding apparatus shown in FIG. 3;

FIG. 18A is a perspective view of a lower body of the grinding apparatus shown in FIG. 17;

FIG. 18B is a perspective view of a central body of the grinding apparatus shown in FIG. 17;

FIG. 21A is a perspective view of a lower body of the grinding apparatus shown in FIG. 19;

FIG. 21B is a lower perspective view of a mesh screen of the grinding apparatus shown in FIG. 19;

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure. Further, although the term "herb" is used to describe an item to be ground, a worker skilled in the art would appreciate that there are many other items that can be ground such that the scope of the grinding apparatus is not limited to herbs.

Figure 1A:
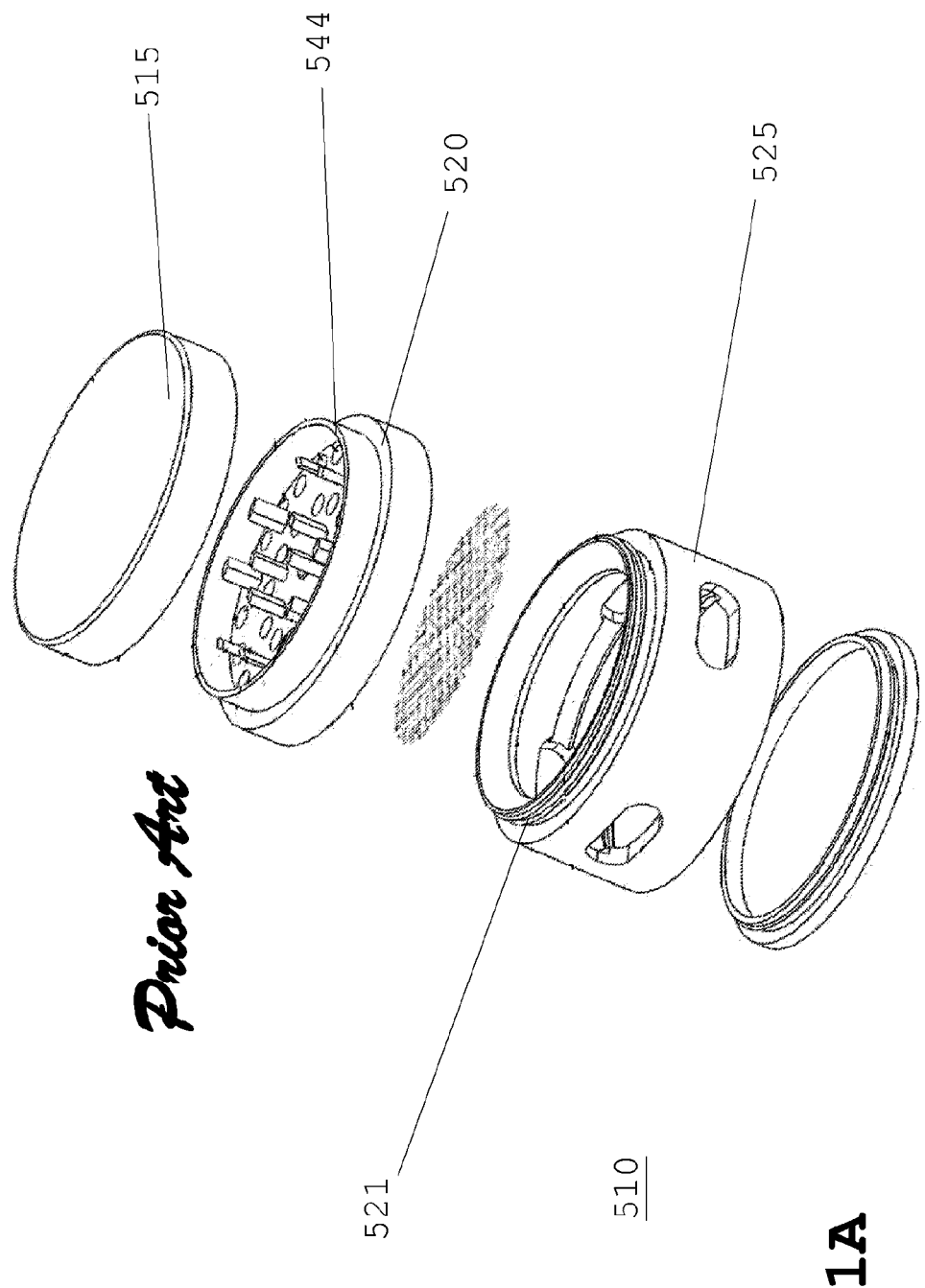
FIG. 1A is an exploded view of a grinding apparatus in accordance with the prior art.
Figure 1B:
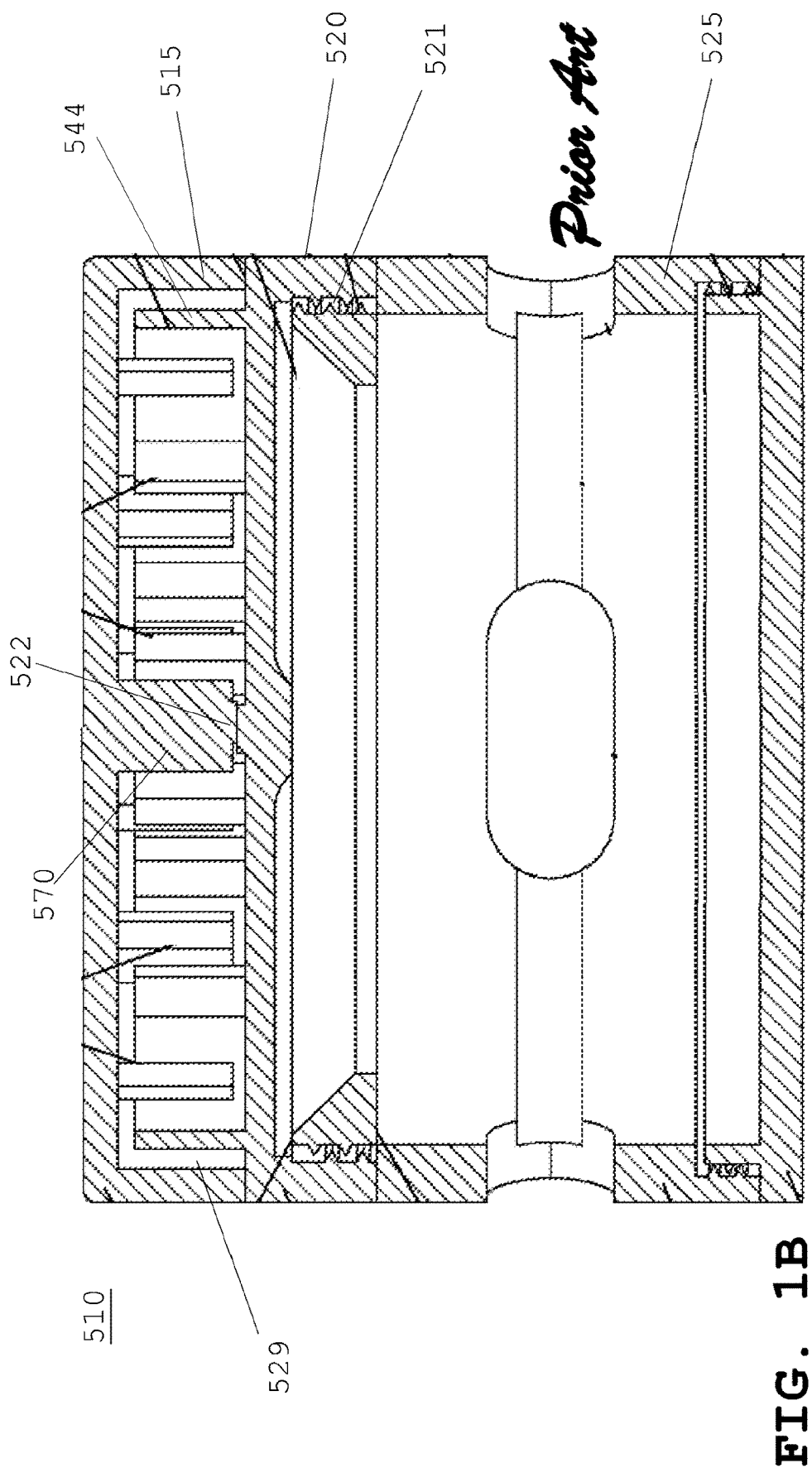
FIG. 1B is front cross-sectional view of the grinding apparatus in accordance with the prior art.

With reference to FIGS. 1A and 1B, a grinding apparatus 510 representing the prior art is shown. Such a grinding apparatus 510 is generally comprised of upper, central and lower bodies 515, 520, 525. The central and lower bodies 520, 525 are secured to one another by a threaded connection 521. The upper and central bodies 515, 520 are secured to one another by an upper magnet 570 positioned on the upper body 515. Unfortunately, this grinding apparatus 510 has many shortcomings. First, when herbs to be ground are deposited in the central body 520, a user must avoid placing herbs in the center of the central body 520. Otherwise, such herbs will be stuck and crushed in the flattened area 522 as specifically shown in FIG. 1B. Herbs stuck in the flattened area 522 also prevent the grinding apparatus 510 of grinding properly as the upper magnet 570 is not properly flush with the central body 520. Another shortcoming of the prior art is that herb residue may get trapped in between the circular peripheral wall 544 of the central body 520 and the outer wall of the upper body 515 in a circular area 529, resulting in jamming of the grinding apparatus 510. Further, the threaded connection 521 between the central and lower bodies 520, 525 results in constant metal on metal wear, which reduces the life of the grinding apparatus 510.

Figure 2:
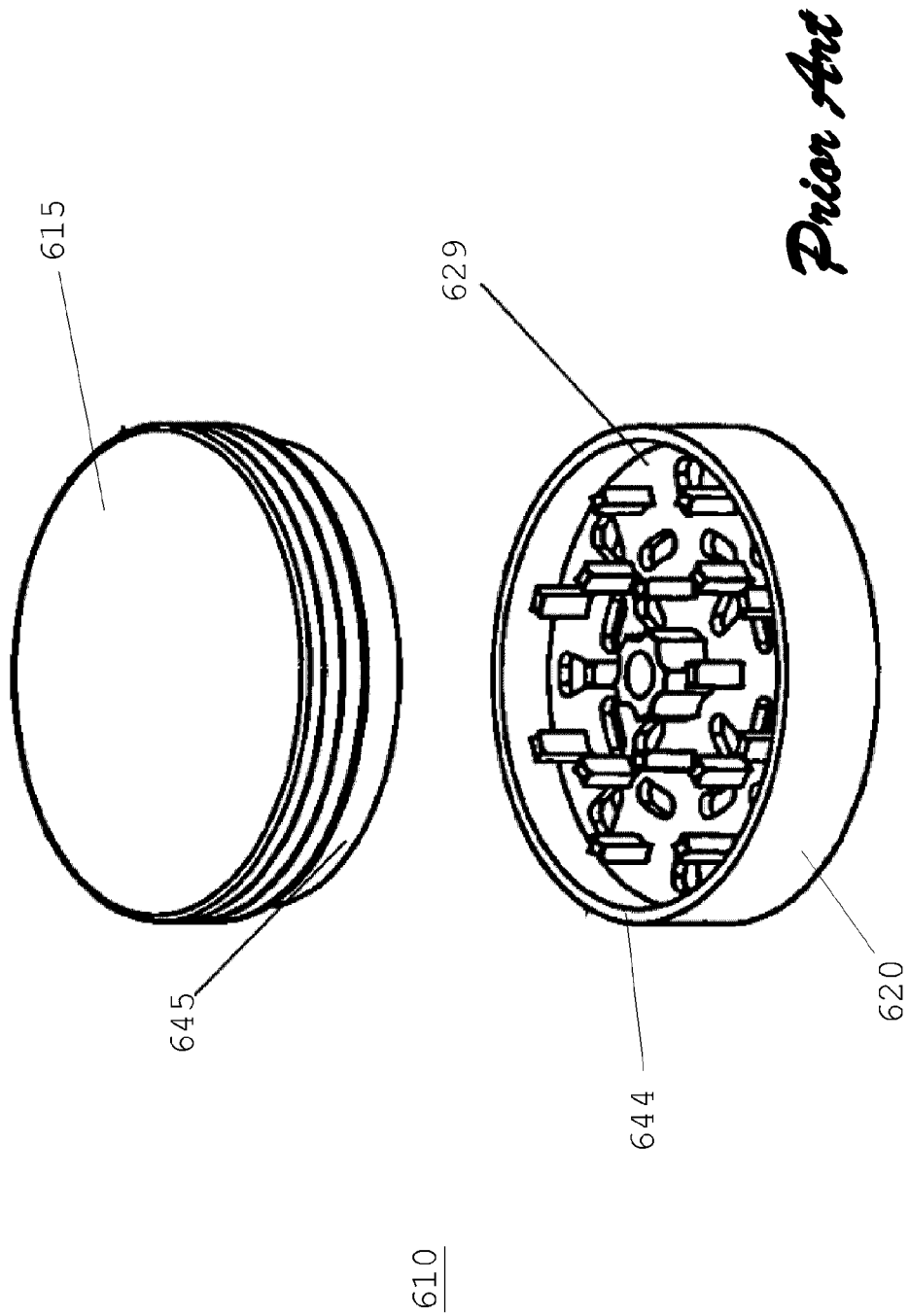
FIG. 2 is an exploded view of another grinding apparatus in accordance with the prior art.

With reference to FIG. 2, another grinding apparatus 610 representing the prior art is shown. One of the shortcomings of this apparatus 610 is that a user must avoid placing herbs in the area 629 proximate the peripheral wall 644 of the central body 620. Otherwise, the inner peripheral wall 645 of the upper body 615 will crush any herbs in area 629, leading to unwanted residue and jamming of the apparatus 610.

Figure 3:
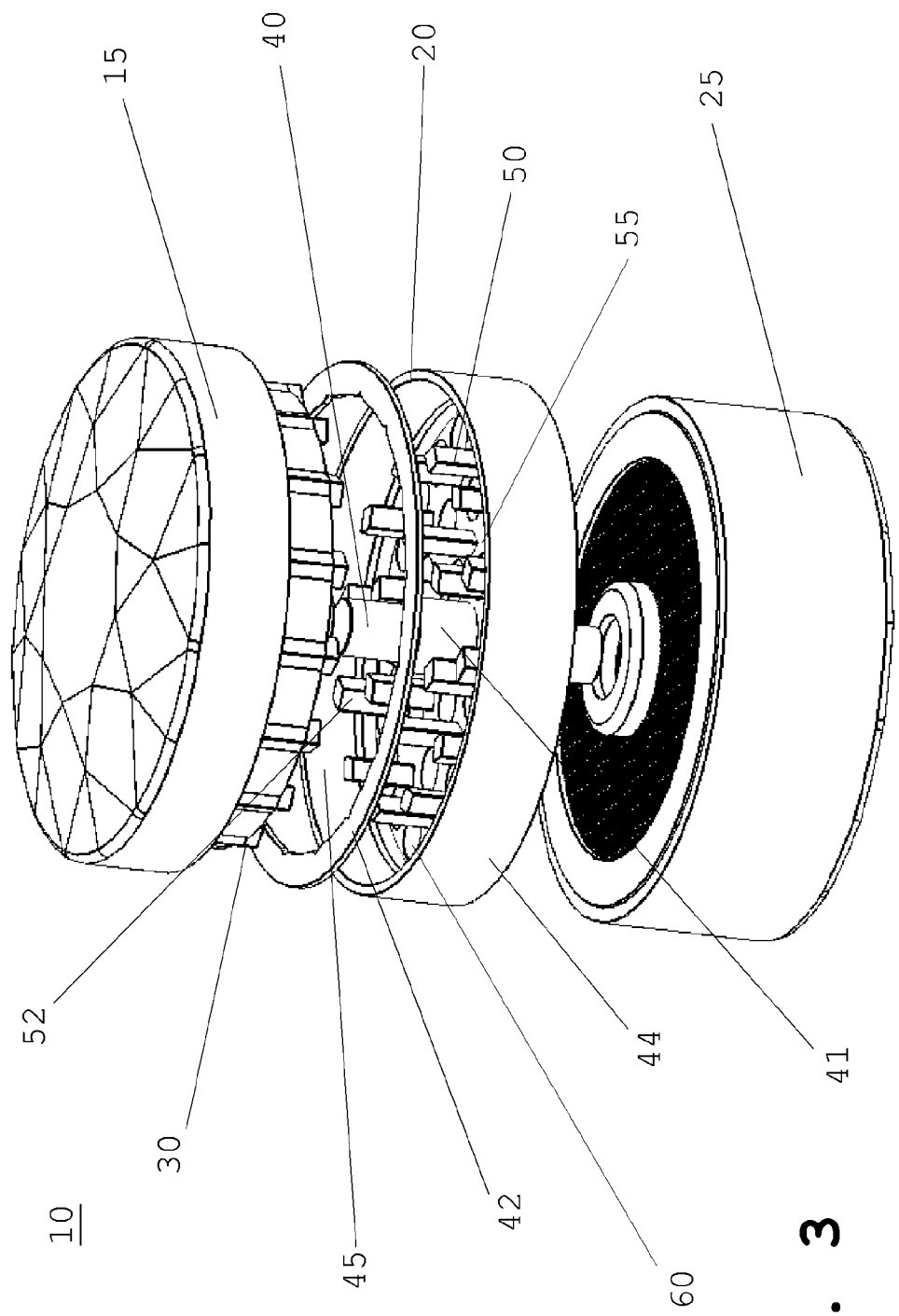
FIG. 3 is an exploded view of a grinding apparatus according to an embodiment of the present disclosure.

With reference to FIG. 3 and according to an embodiment of the present disclosure, a grinding apparatus 10 is shown comprised of an upper body 15, a central body 20 and a lower body 25. The upper, central and lower bodies 15, 20, 25 are cylindrically-shaped and connect to one another using at least axially aligned magnets. The upper body 15 is further comprised of outer grinding teeth 30, middle grinding teeth (not shown) and inner grinding teeth (not shown), together forming the upper grinding teeth. The upper body 15 is further comprised of an upper magnet (not shown) positioned in the center of the upper body 15 to removably connect to a central magnet 40 positioned within a cylindrical member 41 in the center of the central body 20. The upper body 15 is also comprised of a low-friction washer 42 positioned on and secured to the rim of the upper body 15. The washer 42 provides a seal and reduces wear and tear between the upper and central bodies 15, 20 during the grinding process. The central body 20 is surrounded by a circular peripheral wall 44 defining a chamber 45 to receive herbs to be ground, and first and second grinding teeth 50, 52, projecting from an upper surface 55 of the central body 20 to help grind the herbs. During operation, the first and second grinding teeth 50, 52 of the central body 20 cooperate with the upper grinding teeth of the upper body 15 so as to not overlap and efficiently grind the herbs. The upper surface 55 of the central body 20 is further comprised of at least an evacuating aperture 60 to evacuate the herbs out of the chamber 45 and into the lower body 25 during the grinding process. The lower body 25 of the apparatus 10 is comprised of a lower magnet (not shown) positioned at the center of the lower body 25 to removably connect to the central magnet 40 and therefore couple and uncouple the central body 20 from the lower body 25. The lower body 25 is also comprised of a cavity (not shown) to receive the herbs once they have been ground. When the grinding apparatus 10 is assembled, the cavity (not shown) is positioned below the evacuating apertures 60.

Figure 4:
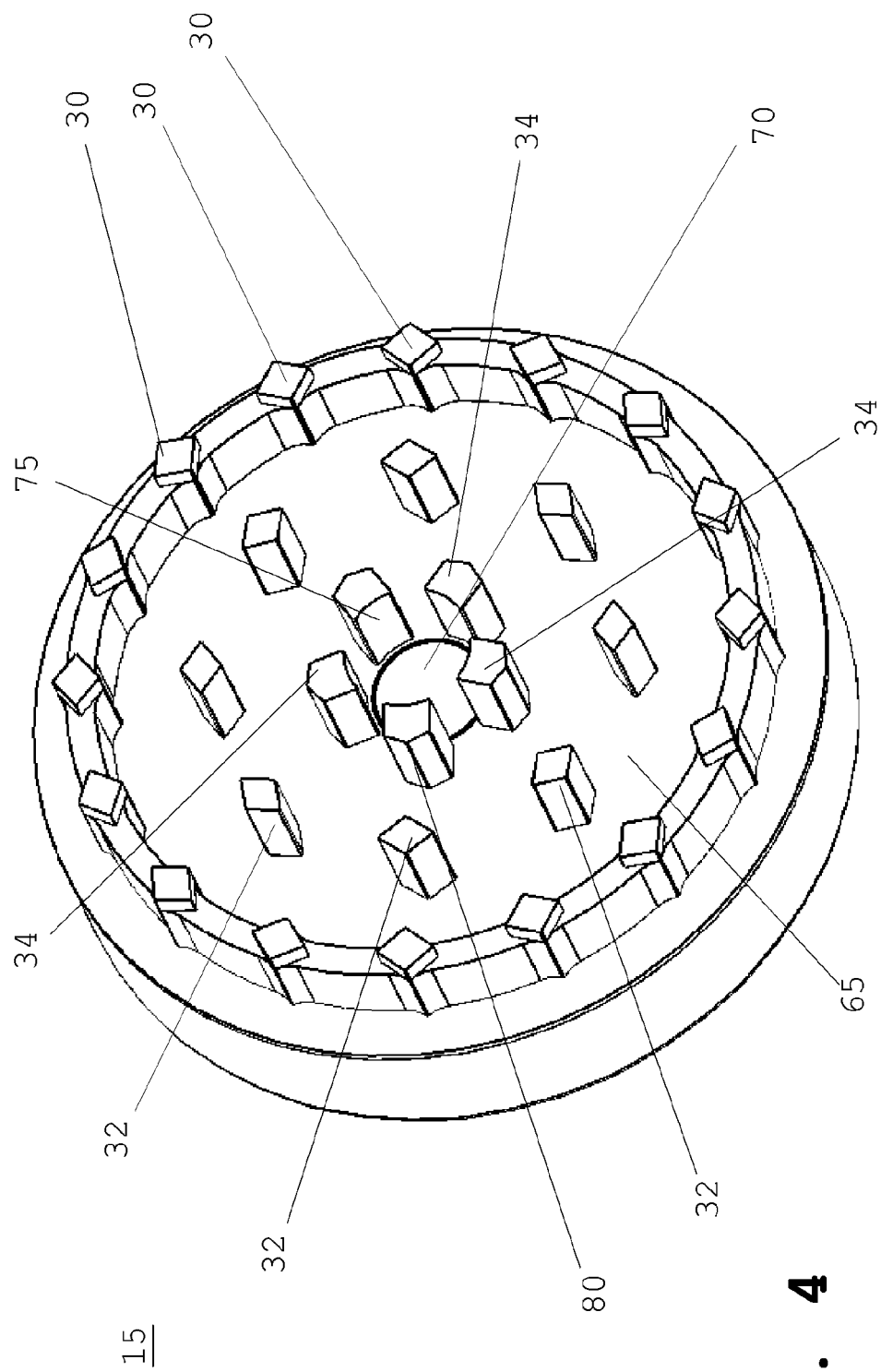
FIG. 4 is a perspective view of an upper body of the grinding apparatus shown in FIG. 3.
Figure 5:
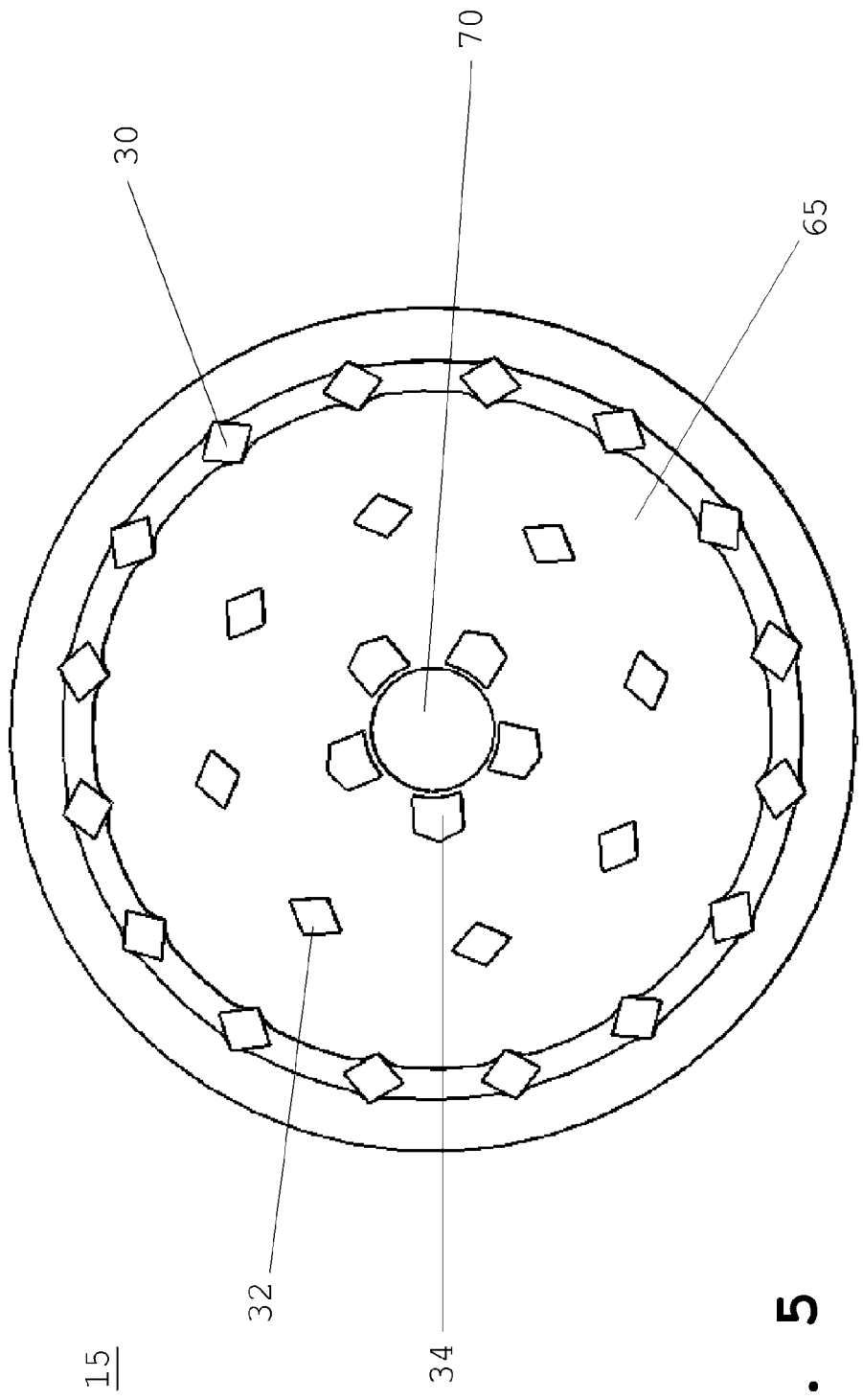
FIG. 5 is a bottom view of the upper body of the grinding apparatus shown in FIG. 3.
Figure 6:
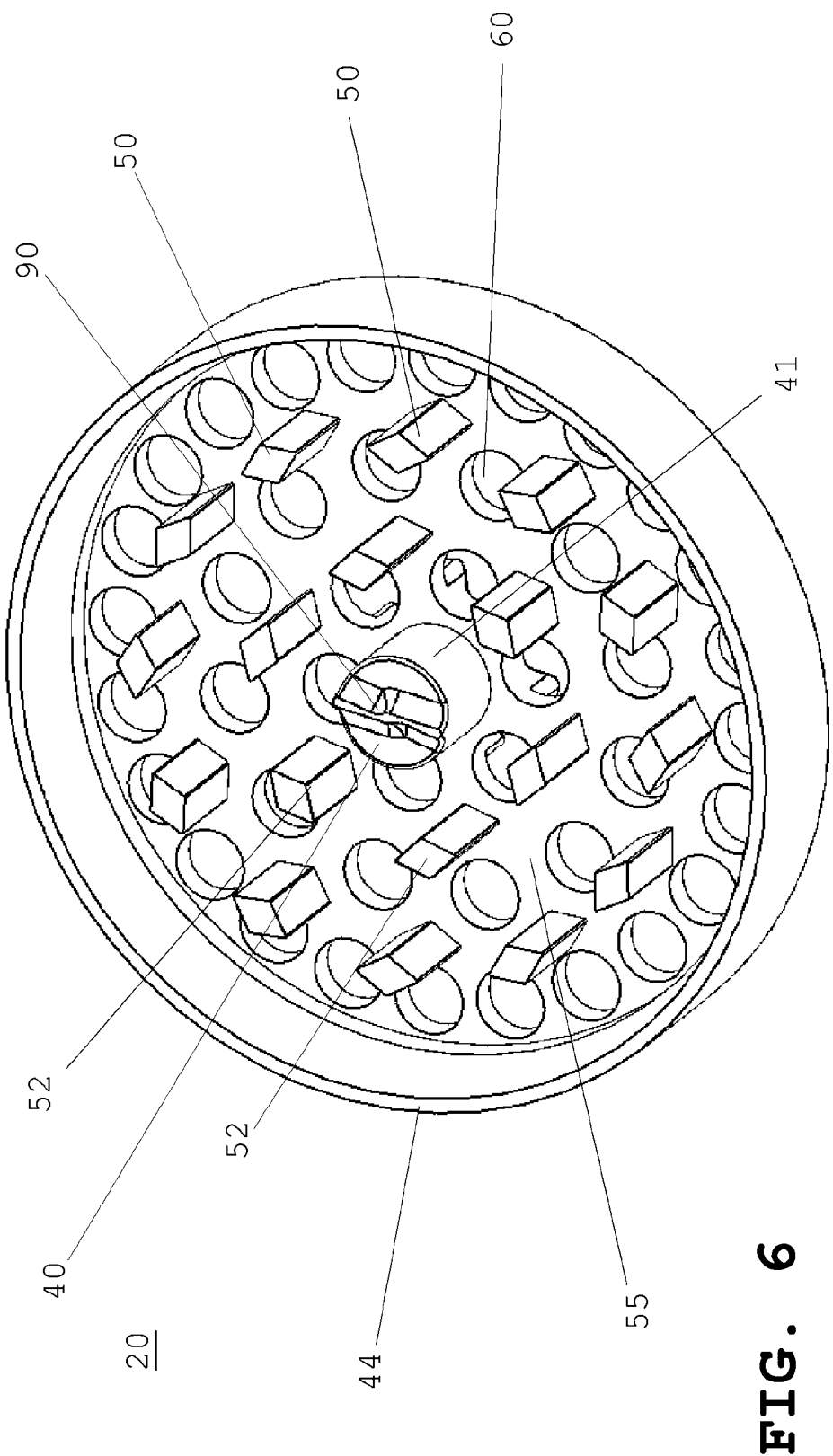
FIG. 6 is an upper perspective view of a central body of the grinding apparatus shown in FIG. 3.
Figure 7:
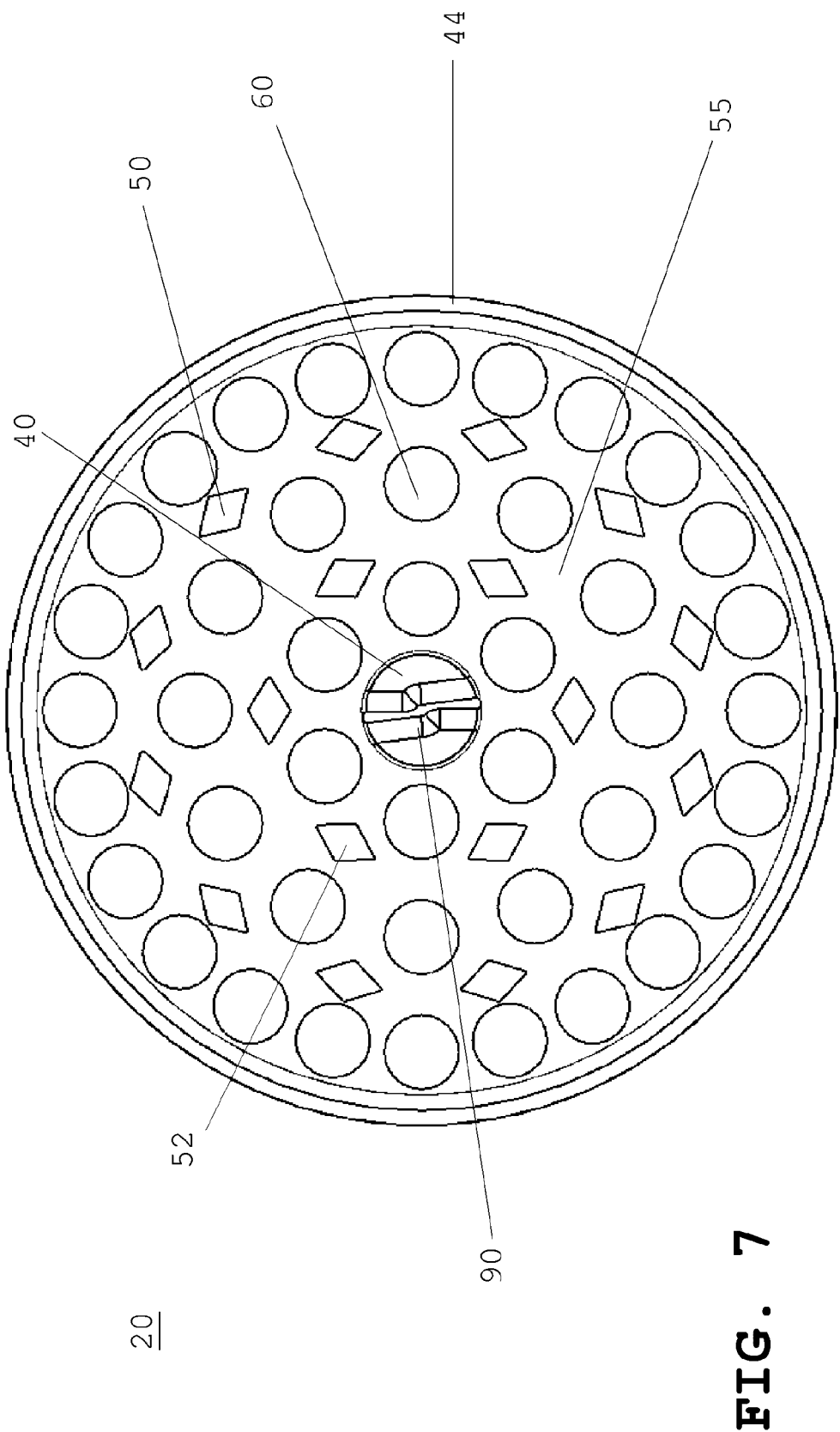
FIG. 7 is a top view of the central body of the grinding apparatus shown in FIG. 3.
Figure 8:
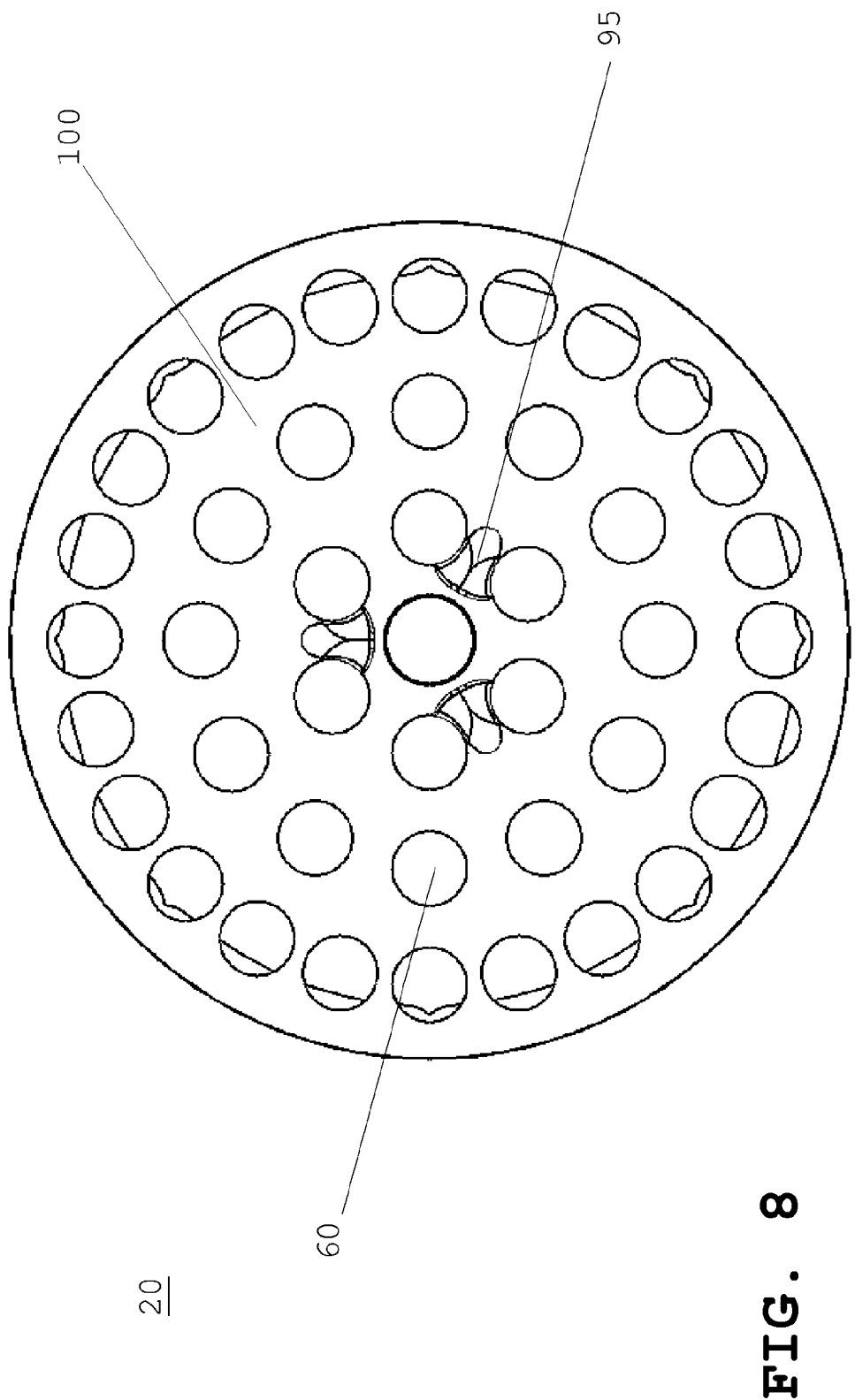
FIG. 8 is a bottom view of the central body of the grinding apparatus shown in FIG. 3.

With reference to FIGS. 3, 4 and 5 and according to an embodiment of the present disclosure, the upper grinding teeth are shown protruding downwardly from an inner surface 65 of the upper body 15. The outer grinding teeth 30 are positioned proximate an outer edge of the upper body 15 and each outer grinding tooth 30 is shaped like a trigonal trapezohedron. A worker skilled in the art would appreciate that as specifically shown in FIG. 3, the outer grinding teeth 30 are positioned proximate the outer edge of the upper body 15 rather than on the outer edge itself. This advantageous positioning of the outer grinding teeth 30 allows for the grinding of any herbs caught in between the outer grinding teeth 30 and the circular peripheral wall 44 when the upper body 15 is connected to the central body 20. In the prior art as shown in FIGS. 1A, 1B and 2, herbs and other materials are forced and pressed into this area, leading to unwanted jamming of the grinder, which is prevented in the present apparatus 10. The central grinding teeth 32 are also shaped like trigonal trapezohedrons and are positioned approximately halfway between the outer perimeter and the center of the upper body 15. The inner grinding teeth 34 are positioned proximate to the center of the inner surface 65 of the upper body 15. The inner grinding teeth 34 have curved inner faces 75 that correspondingly surround the cylindrical member 41 and the central magnet 40 of the central body 20 when the upper body 15 is connected to the central body 20. The curvature of the inner faces 75 is designed to substantially surround the cylindrical member 41 of the central body 20 and help maintain the axial alignment in between the upper and central bodies 15, 20. A worker skilled in the art would appreciate that the curvature of the inner faces 75 is not perfectly flush with the cylindrical member 41, but they are sufficiently close to minimize the radial movement between the upper and central bodies 15, 20 and also prevent the outer grinding teeth 30 from making contact with the circular peripheral wall 44 of the central body 20. The connection between the inner faces 75 and the cylindrical member 41 also eliminates any metal on metal wear that would normally occur in between the outer grinding teeth 30 and the circular peripheral wall 44 and limits any such metal on metal wear to contact between the inner faces 75 of the inner grinding teeth 34 and the cylindrical member 41. The outer faces 80 of the inner grinding teeth 34 are triangularly shaped to provide additional grinding means to grind the herb. A worker skilled in the art would appreciate that although the grinding teeth have the general profile of a rhombus, other geometries are possible to provide the function of cutting the herbs. An upper magnet 70 is also shown, located at the center of the upper body 15 and flush with the inner surface 65 to axially align to and connect with the central magnet 40 of the central body 20.

With reference to FIGS. 3, 6, 7 and 8 and according to an embodiment of the present disclosure, the central body 20 is shown, having first and second grinding teeth 50, 52 protruding outwardly from an upper surface 55. The first grinding teeth 50 are positioned proximate the outer perimeter of the central body 20 and the second grinding teeth 52 are positioned proximate to the center of the central body 20. First and second grinding teeth 50, 52 are trigonal trapezohedron-shaped to facilitate the grinding of the herbs. A cylindrical member 41 is shown, positioned at the center of the central body 20 and encasing the central magnet 40. The cylindrical member 41 is further comprised of cutting edges 90 that make contact with the upper magnet (not shown) of the upper body 15. The purpose of the cutting edges 90 is to cut and evacuate any part of the herb that was trapped in the center area of the upper body 15, typically atop of the upper magnet (not shown). This is advantageous over the prior art as shown in FIG. 1B, where herbs are normally trapped and flattened in this central area, leading to malfunctioning of the grinding apparatus. Although the cutting edges 90 are shaped similar to a 2-flute end mill, a worker skilled in the art would appreciate that other cutting edge shapes can be used, provided that they cut and evacuate trapped herbs found in that central area. The central body 20 is further comprised of a plurality of evacuating apertures 60 positioned on the upper surface 55. During operation of the grinding apparatus 10, herbs that have been cut and ground in sufficiently small pieces will fall through the evacuating apertures 60 and into the lower body 25. The central body 20 is further comprised of angular guides 95 positioned on a lower surface 100. In this particular embodiment, there are three angular guides 95 to facilitate the connection between the central and lower bodies 20, 25. Indeed, the shape of the angular guides 95 correspond to the shape of a locking member (not shown) of the lower body 25, such that the lower body 25 can only mate with the central body 20 in specific configurations.

Figure 9:
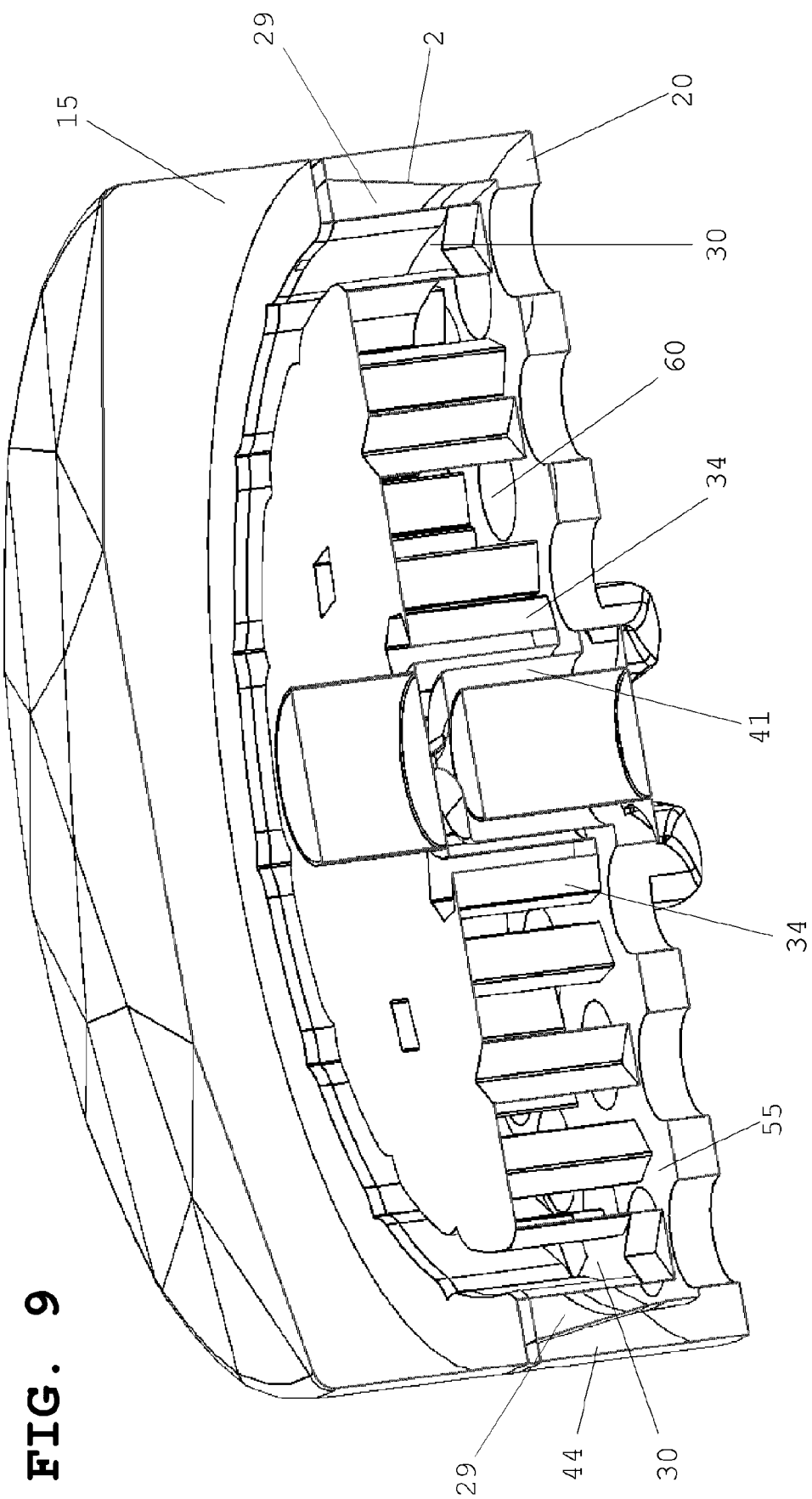
FIG. 9 is a perspective cross-sectional view of the upper body connected to the central body of the grinding apparatus shown in FIG. 3.

With reference to FIG. 9, the upper body 15 is shown connected to the central body 20. As was previously described, when the upper body 15 is connected to the central body 20, the outer grinding teeth 30 are positioned proximate the outer edge of the upper body 15 and therefore proximate the circular peripheral wall 44 of the central body 20. As shown, the circular peripheral wall 44 is comprised of a sloping inner surface 28 to guide the herbs into a narrower space. The outer grinding teeth 30 and the peripheral wall 44 define area 29, where some herbs can be caught when the upper body 15 is connected to the central body 20. As was previously described, this advantageous positioning of the outer grinding teeth 30 relative to the circular peripheral wall 44 allows for the grinding of any herbs caught in area 29 between the outer grinding teeth 30 and the circular peripheral wall 44. In the prior art as specifically shown in FIG. 2, a user must avoid placing materials proximate the peripheral wall 44. Otherwise, those materials are compressed in area (529 shown in FIG. 2), which causes many herbs to release a sticky residue. This sticky residue in the area 529 shown in FIG. 2 seeps in between the metal on metal connection at the periphery of the upper and central bodies, leading to unwanted jamming of the grinder. Such jamming is prevented in the present apparatus, as herbs trapped in area 29 are simply ground by outer grinding teeth 30 before they are evacuated through apertures 60. The only metal on metal contact between the upper and central bodies 15, 20 is between the inner grinding teeth 34 and the cylindrical member 41. If any herbs are caught therein and compressed or flattened, releasing a residue, such residue is limited to the center of the apparatus. As the curvature of the inner faces 75 is not perfectly flush with the cylindrical member 41 to allow for minimal radial movement between the upper and central bodies 15, 20, such residue does not cause the apparatus to jam. It should also be appreciated that unlike the prior art, the outer grinding teeth 30 are able to grind out any materials trapped in between the outer grinding teeth 30 and the upper surface 55 of the central body 20 when the upper body 15 is connected to the central body 20. Unlike the prior art shown in FIG. 2, the outer grinding teeth 30 are positioned above evacuating apertures 60 to assist in the evacuation of the herbs into the lower body (not shown).

Figure 10:
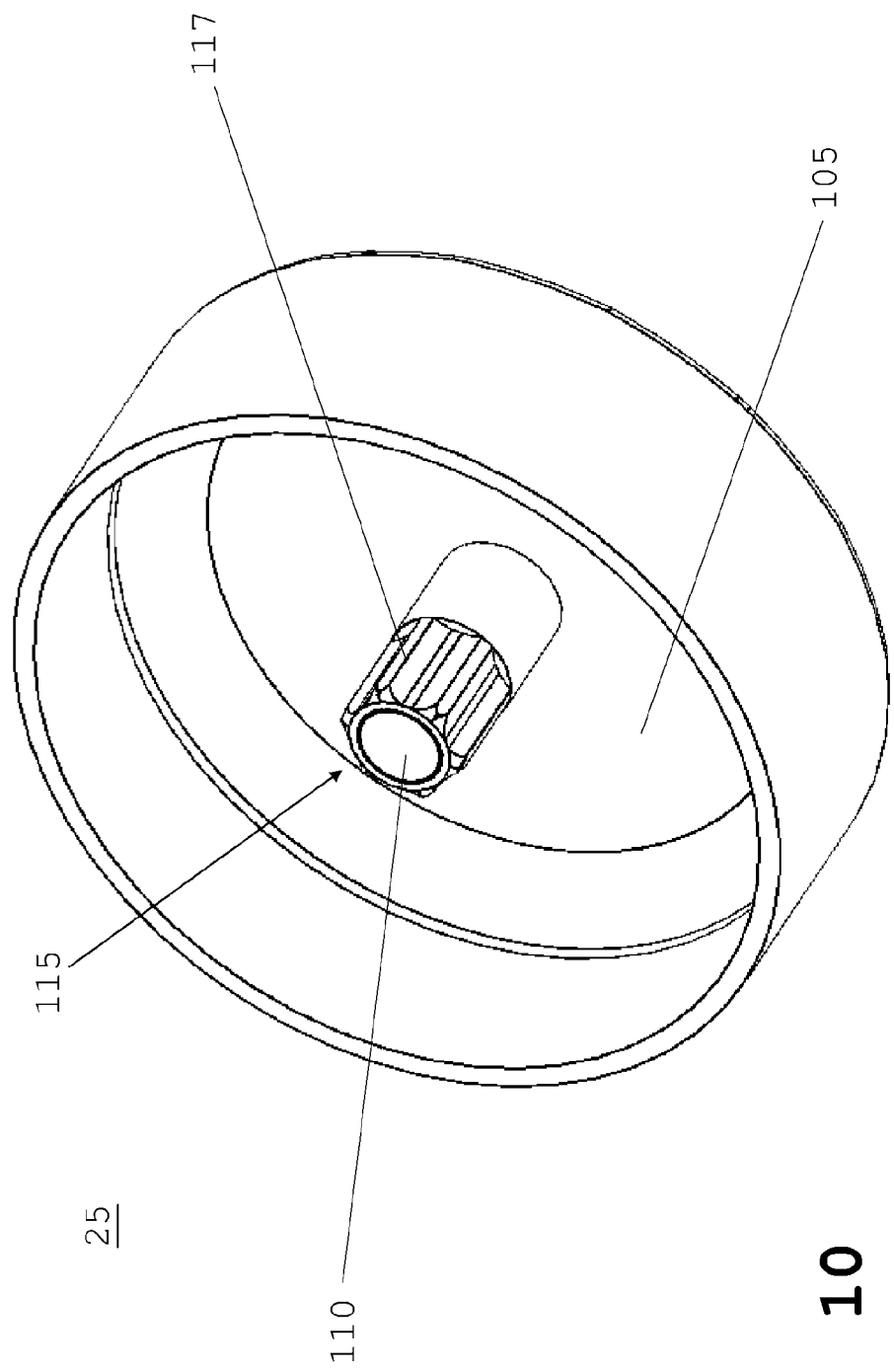
FIG. 10 is a perspective view of a lower body of the grinding apparatus shown in FIG. 3.
Figure 11A:
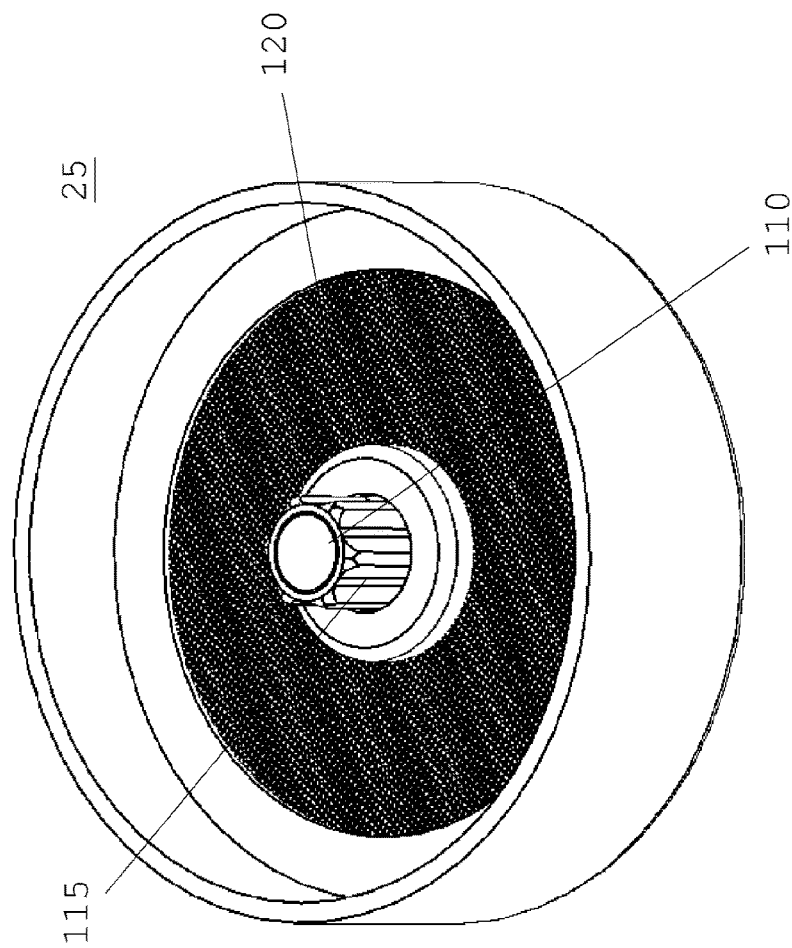
FIG. 11A is a perspective view of the lower body and a mesh screen of the grinding apparatus shown in FIG. 3.
Figure 11B:
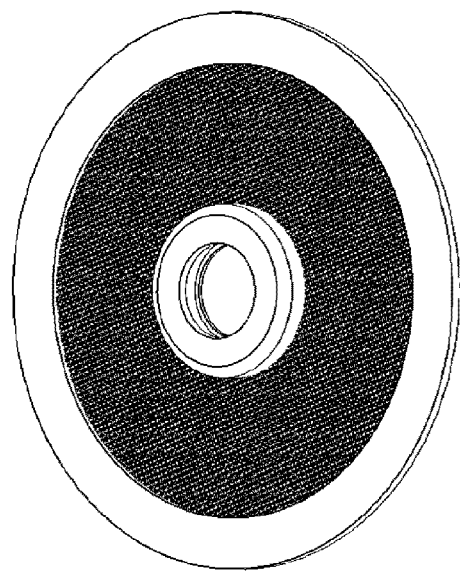
FIG. 11B is a perspective view of the mesh screen of the grinding apparatus shown in FIG. 3.
Figure 12B:
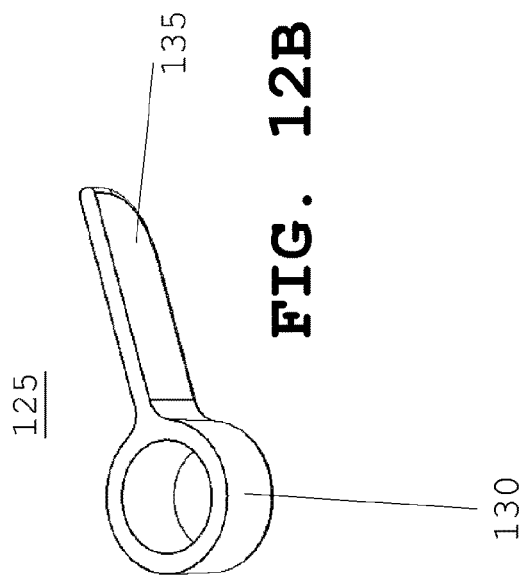
FIG. 12B is a perspective view of the scraper of the grinding apparatus shown in FIG. 3.
Figure 12A:
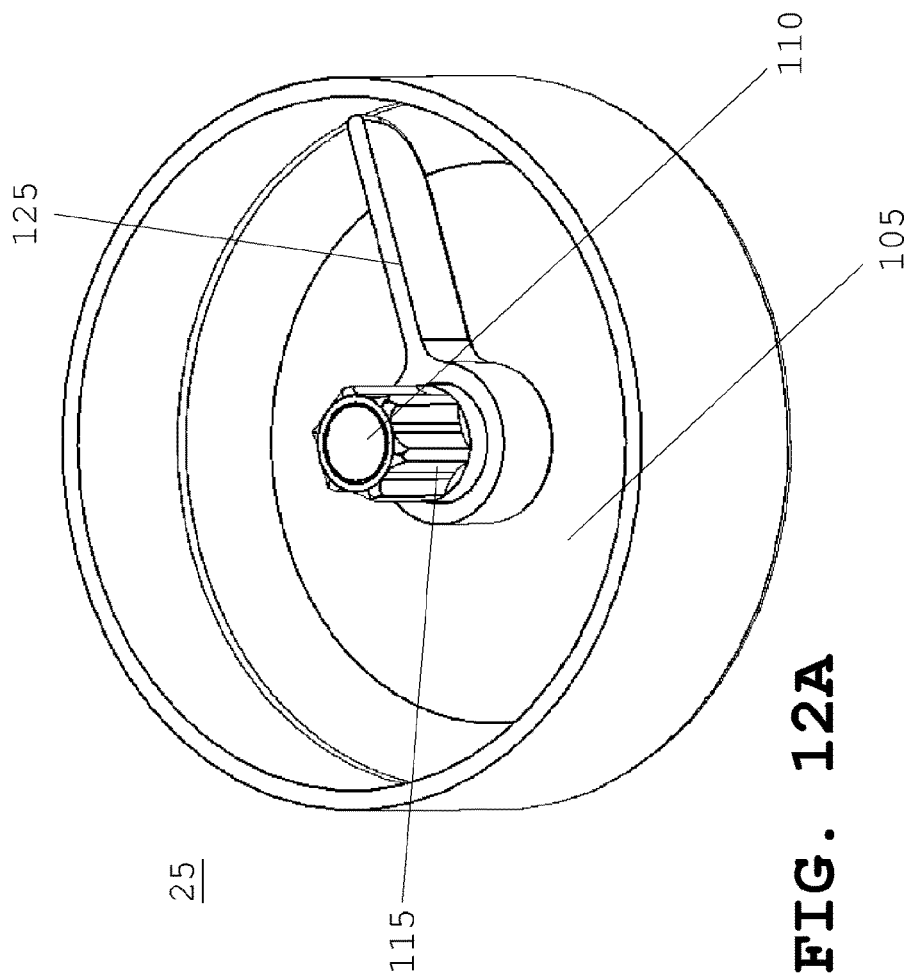
FIG. 12A is a perspective view of the lower body and a scraper of the grinding apparatus shown in FIG. 3.
Figure 13:
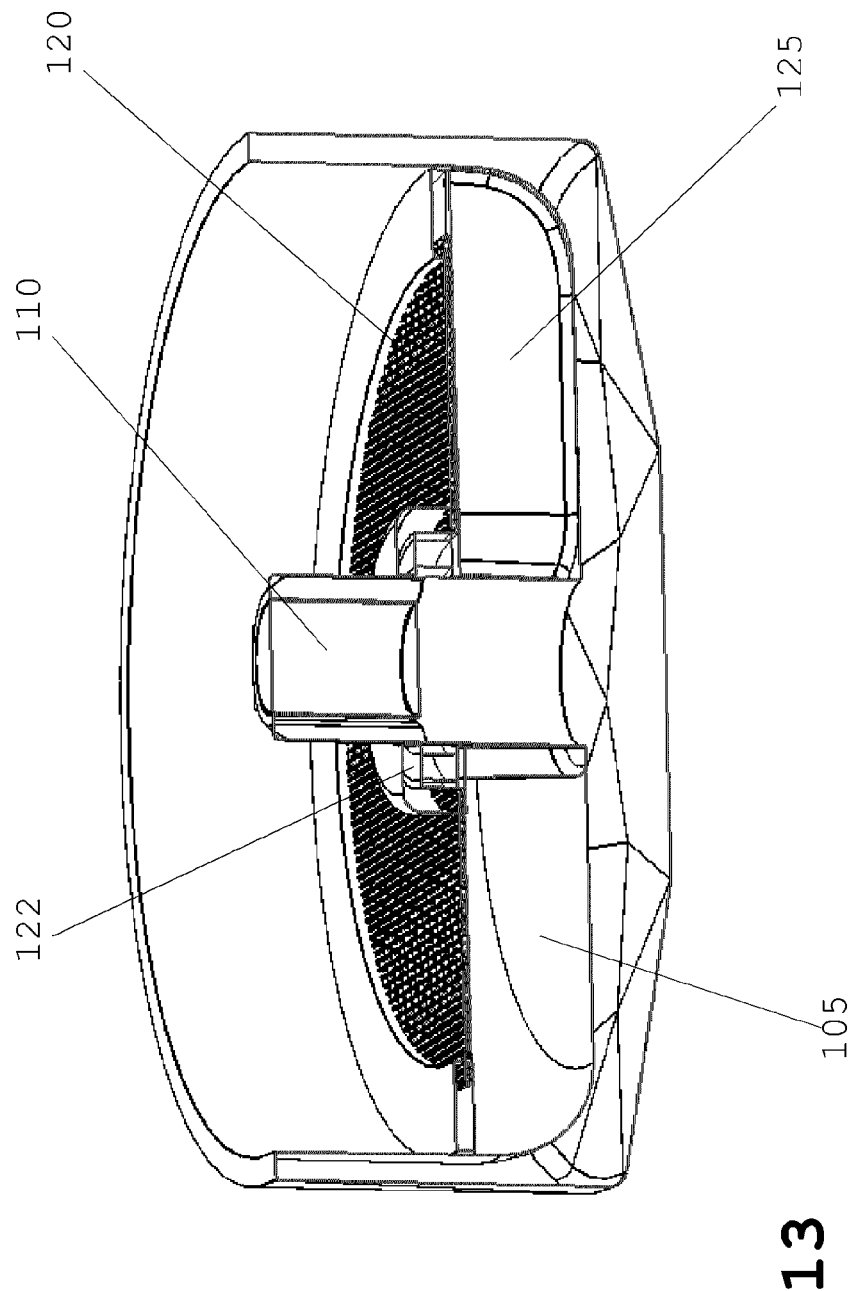
FIG. 13 is a cross-sectional perspective view of the lower body, mesh screen and scraper of the grinding apparatus shown in FIG. 3.

With reference to FIGS. 3 and 10, the lower body 25 is shown in greater detail, comprised of a cavity 105 to catch the herbs once they have been ground by the grinding teeth of the upper and central bodies 15, 20. A lower magnet 110 is also shown, projecting upwardly from the center of the cavity 105 to provide a connection to the central magnet 40 of the central body 20. The lower magnet 110 is surrounded by a locking member 115, having a generally TORX™ shape designed to lock into place in between the angular guides (not shown) of the central body 20. In other words, the locking member 115 has a plurality of radial projections 117 constructed and arranged to fit in between each of the angular guides (not shown).

With reference to FIGS. 11A, 11B, 12A, 12B and 13, the lower body 25 is shown with an optional screen 120 and an optional scraper 125. The screen 120 is a fine mesh screen that can further separate small particles from even smaller particles during the grinding process. The mesh screen 120 is disc-shaped to fit around the lower magnet 110 and locking member 115. To secure the screen 120 in place within the cavity 105 of the central body 20, the center of the screen 120 is comprised of an annular magnet 122, which interacts with the lower magnet 110 and forces the screen 120 into place. An optional scraper 125 is provided that is comprised of a ring portion 130 to surround and rotate around the lower magnet 110. Meanwhile, a sweeper portion 135 of the scraper 125 sweeps the floor of the cavity 105 to gather all of the filtered particles that made their way through the screen 120.

Figure 14A:
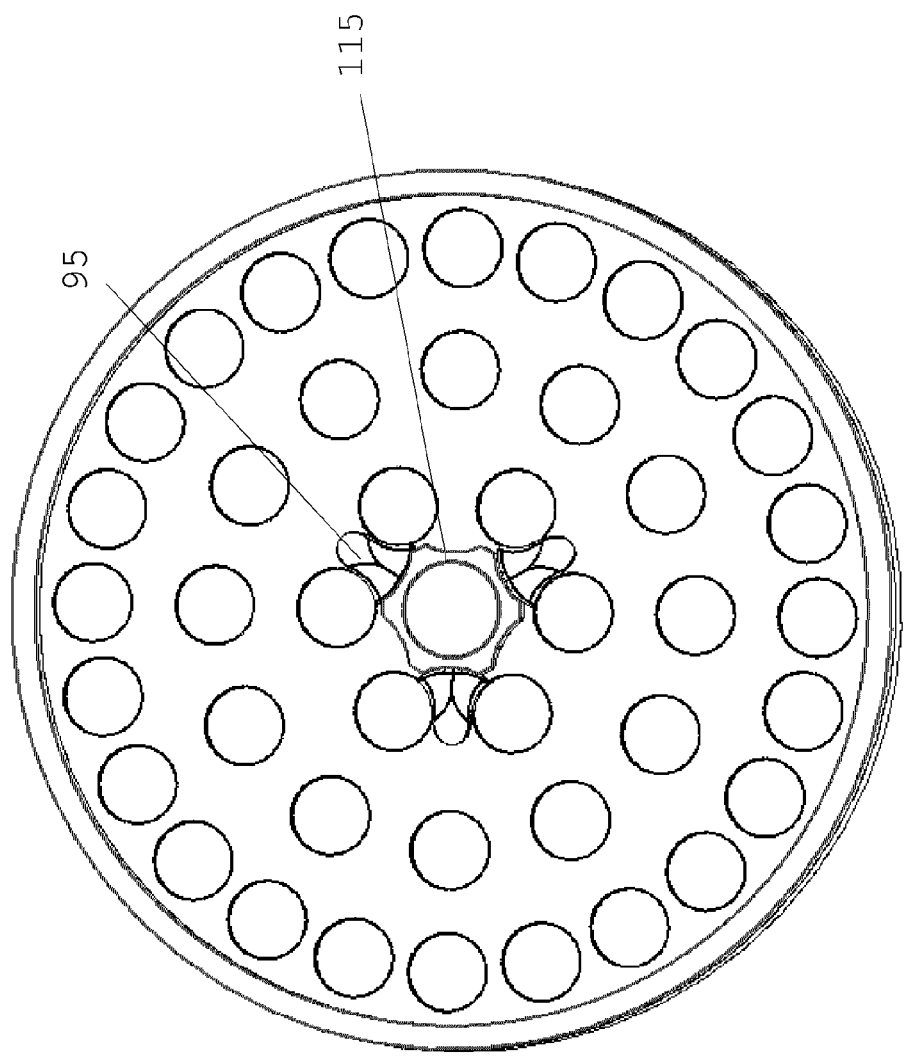
FIG. 14A is a cross-sectional view of the grinding apparatus as described in FIG. 14.

With reference to FIGS. 14 and 14A and according to an embodiment of the present disclosure, the grinding apparatus 10 is shown assembled, having the upper, central and lower bodies 15, 20, 25 in magnetic axial alignment. When assembled, the upper magnet 70 is in close proximity and axially aligned to the central magnet 40 such that they are attracted to one another and provide a connection means between the upper body 15 and the central body 20. The cutting edges 90 are also shown, making contact with the flush surface of the upper magnet 70. During the grinding process, when the upper body 15 is rotated independently from the central body 20, the cutting edges 90 rotate as well and cut and evacuate any herbs that are located below the upper magnet 70. As shown, the upper grinding teeth of the upper body 15 cooperate with the first and second grinding teeth (not shown) to cut any herbs in the chamber 45 of the central body 20 and evacuate the ground herbs through the evacuating apertures 60 and into the cavity 105 of the lower body 25. The central magnet 40 is shown in proximity and axially aligned to the lower magnet 110 such that the central body 20 is removably secured to the lower body 25. During the grinding process, the central body 20 is secured to and cannot rotate independently from the lower body 25 by means of the angular guides 95 locked into the locking member 115 as specifically shown in FIG. 12A.

With reference to FIGS. 3 and 14 and according to an embodiment of the present disclosure, the operation of the grinding apparatus 10 will be described. First, the central body 20 is secured to the lower body 25 by axially aligning the central magnet 40 to the lower magnet 110 and moving the central body 20 towards the lower body 25. The locking member 115 of the lower body 25 will approach and lock into the angular guides 95 of the central body 20 and prevent the central body 20 from rotating independently from the lower body 25 as shown in FIG. 14A. If the central body 20 is angularly offset from the lower body 25, the tapered upper portion of the angular guides 95 will guide the locking member 115 into the correct position. Second, the herbs to be ground are deposited into the chamber 45 of the central body 20. Third, the upper body 15 is secured to the central body 20 by axially aligning the upper magnet 70 to the central magnet 40 and moving the upper body 15 towards the central body 20. When the upper and central magnets 70, 40 are in close proximity, sufficient force is provided to connect the upper body 15 to the central body 20. Fourth, the upper body 15 is rotated independently from the central and lower bodies 20, 25 such that the herbs are ground in the chamber 65 by the counter-rotation of the upper grinding teeth and the first and second grinding teeth 50, 52, respectively. During this fourth step, if a user rotates the upper body 15 laterally away from the central body 20, the inner faces 75 of the inner grinding teeth 34 will abut the cylindrical member 41 and prevent further lateral movement of the upper body 15 relative to the central body 20. Fifth, the central body 20 is then separated from the lower body 25 and the ground herbs can be removed from the lower body 25.

Figure 15:
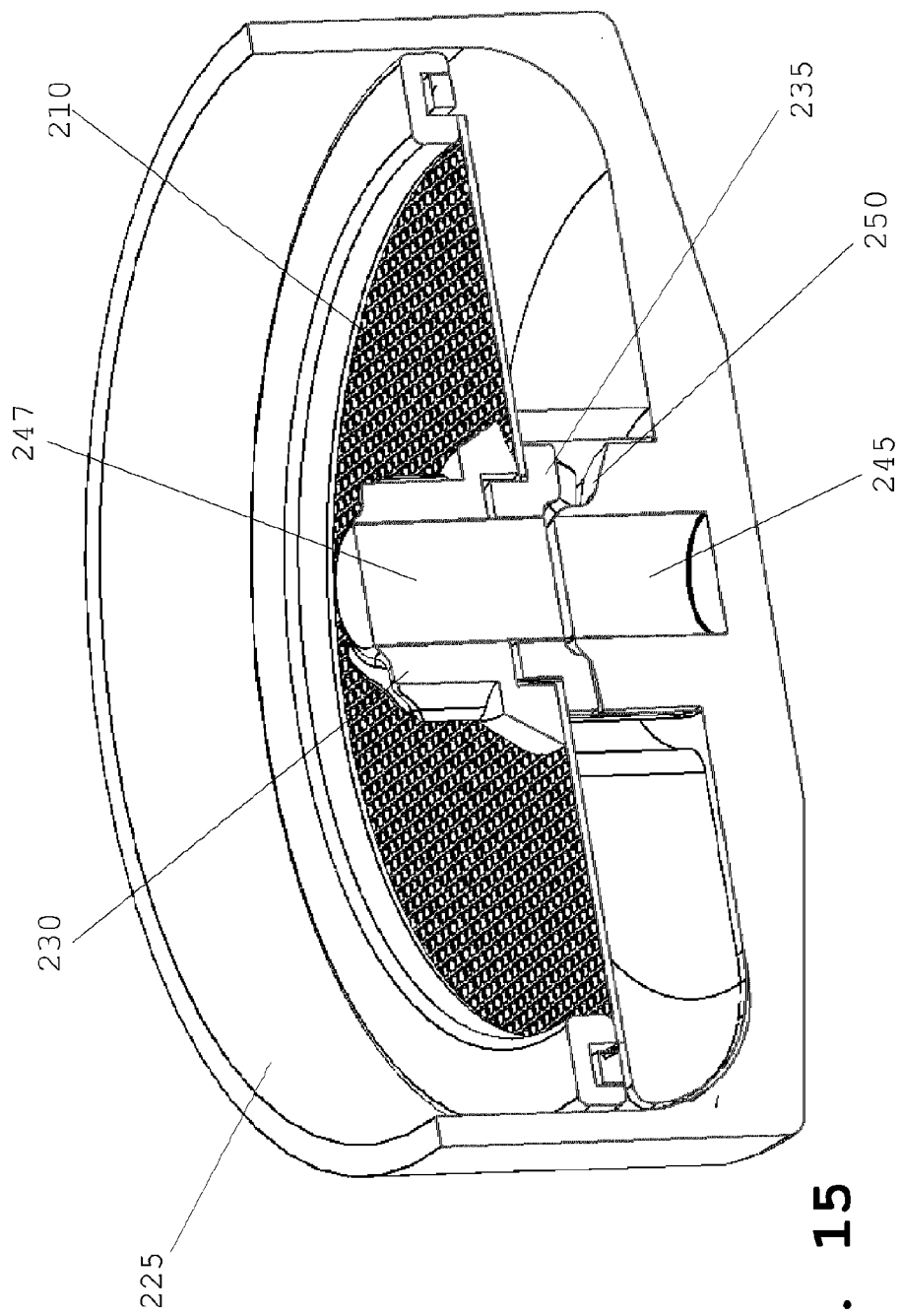
FIG. 15 is a perspective cross-sectional view of the lower body and mesh screen of the grinding apparatus, according to another embodiment of the present disclosure.
Figure 16:
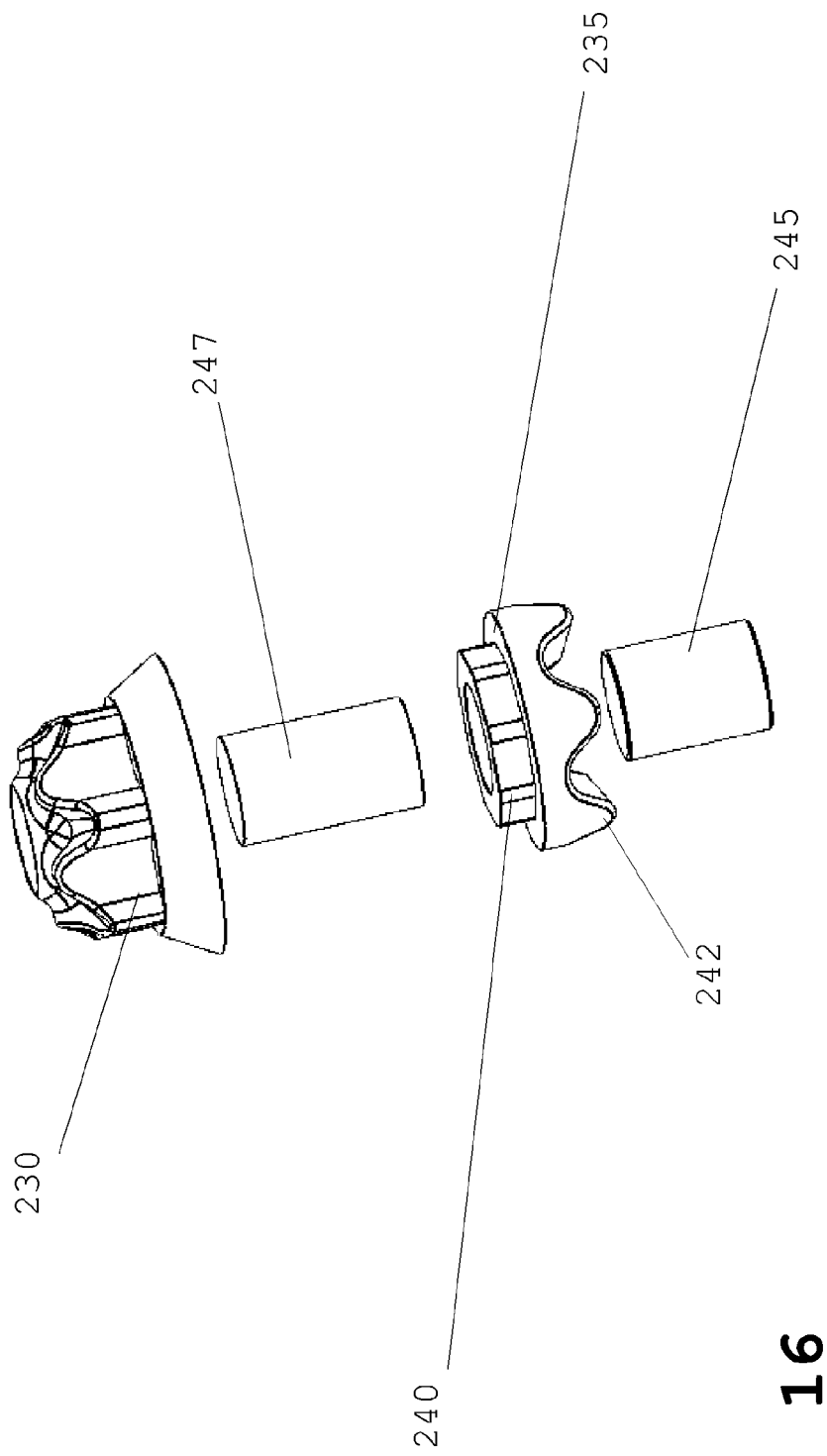
FIG. 16 is an exploded view of a gear, locking member and first and second magnets of the grinding apparatus shown in FIG. 15.
Figure 17:
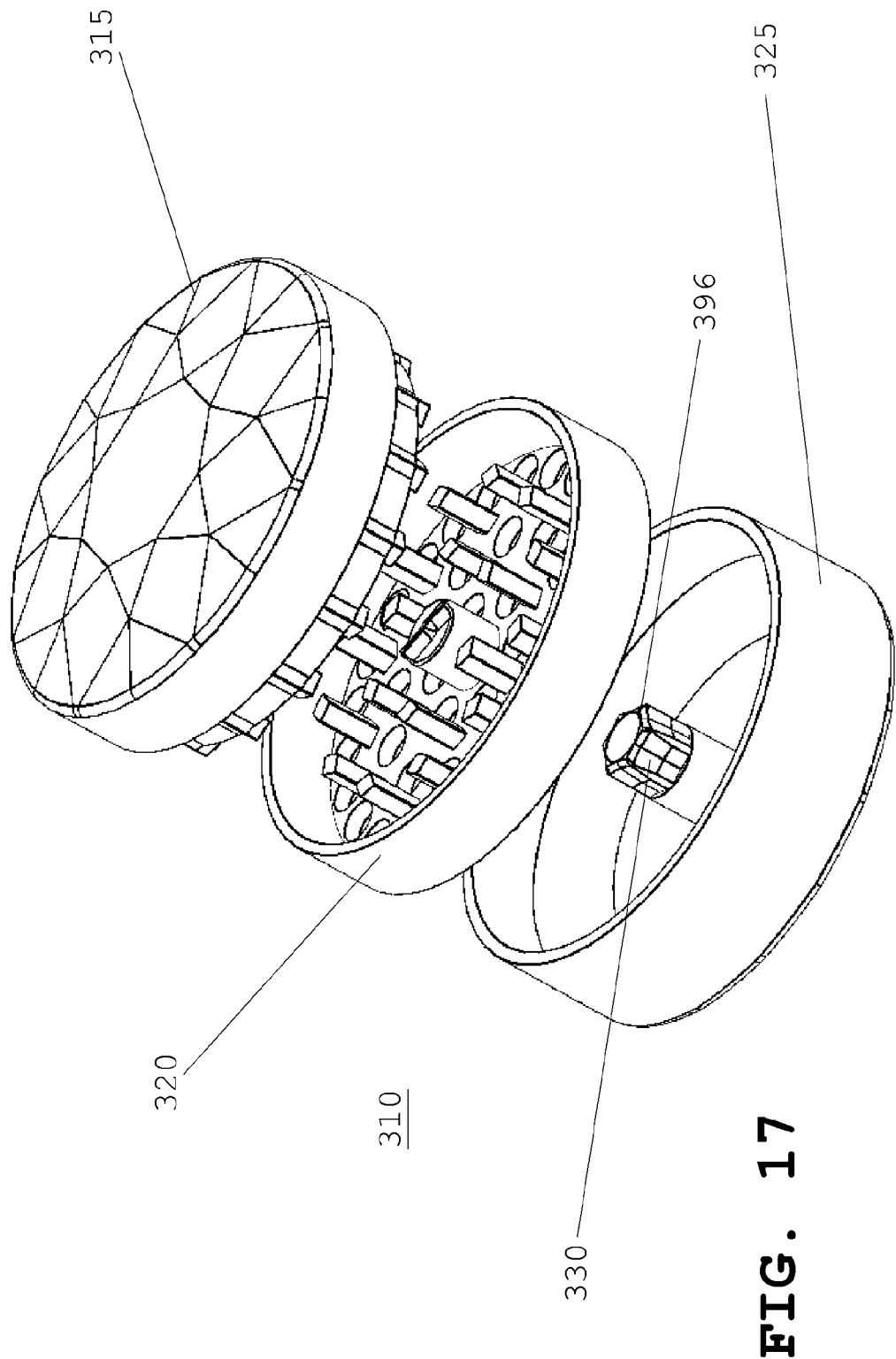
FIG. 17 is an exploded view of a grinding apparatus, according to yet another embodiment of the present disclosure.

With reference to FIGS. 15 and 16 and according to another embodiment of the present disclosure, an optional screen 210 is shown positioned within the lower body 225. The screen 210 is secured in between a locking member 230 and a gear 235. The gear 235 is further comprised of a flange 240 on an upper end that is inserted within a cavity (not shown) of the locking member 230. The flange 240 serves to secure the gear 235 to the locking member 230 and transfer torque from the gear 235 to the locking member 230. The gear 235 is also comprised of teeth 242 positioned at a lower end to connect to positioning teeth 250 of the lower body 225. The lower body 225 is further comprised of first lower magnet 245 while the mesh screen 210 is further comprised of a second lower magnet 247. The first lower magnet 245 is positioned at a lower end and in the center of the lower body 225. The first lower magnet 245 is substantially surrounded by the positioning teeth 250 to receive the teeth 242 of the gear 235. The second lower magnet 247 is substantially surrounded by the locking member 230 of the mesh screen 210. The first magnet 245 connects to the second magnet 247, while the second magnet 247 would connect to a central magnet (not shown) of the central body (not shown). A worker skilled in the art would appreciate that there is a stronger magnetic connection between the first and second magnets 245, 247 than between the second magnet 247 and the central magnet (not shown). As such, when the lower body 225 is separated from the central body (not shown), the locking member 230 and screen 210 remain within the lower body 225 until removed separately. Indeed, once the central body (not shown) has been disconnected from the lower body 225, an operator could then separately remove the locking member 230, mesh screen 210 and gear 235 by pulling on the locking member 230. A worker skilled in the art would appreciate that the present apparatus uses rounded teeth to facilitate the connection in between various components. Therefore, if the first and second lower magnets 245, 247 are generally axially aligned, the rounded teeth of the gear 235 and lower body 225 will interact with one another to slip into the correct position and lock the lower body 225 to the gear 235. Similarly, if the second lower magnet 247 is axially aligned with the central magnet (not shown) of the central body (not shown), the rounded teeth of the locking member 230 will interact with rounded teeth of the central body (not shown) to lock one to the other.

With reference to FIGS. 17, 18A, 18B, 18C and 18D and according to another embodiment of the present disclosure, a grinding apparatus 310 is shown further comprised of an upper body 315, central body 320 and a lower body 325. The central body 320 is further comprised of three improved angular guides 395 to connect to an improved locking member 330 of the lower body 325. The locking member 330 is further comprised of a tapered rim 396 to facilitate the initial contact with a rounded edge 393 of the angular guides 395. A worker skilled in the art would appreciate that an optimal radius of the rounded edge would be of 0.5 mm, although other radii are within the scope of the disclosure. The angular guides 395 are shown in greater detail in FIG. 18C and are each further comprised of at least a contact wall 391, tapered surface 392 and rounded edges 393. The angular guides 395 have been modified from the angular guides shown in FIG. 14A. Specifically, the angular guides 395 have an increased height relative to the lower surface 300 of the central body 320, to increase the surface area of the angular guides 395 and therefore provide a better connection with the locking member 330. In addition to their increased length, the contact walls 391 also have a wider surface area to better mate with a corresponding surface 394 of the locking member 330. Finally, the tapered edges 392 have an additional 5-degree taper to further facilitate the connection between the central and lower bodies 320, 325. It has been shown that the optimal height of the angular guides 395 is 2.9 mm. It has also been shown that a 5-degree tapering of the surface 394 of the locking member 330 and a 5-degree tapering of the contact walls 391 of the angular guides 394 is optimal. Specifically, the combination of the 5-degree tapering and the 2.9 mm height are optimal and greatly reduces camming out and backlash that can occur between the central and lower bodies 320, 325 during the grinding operation of the apparatus.

Figure 18C:
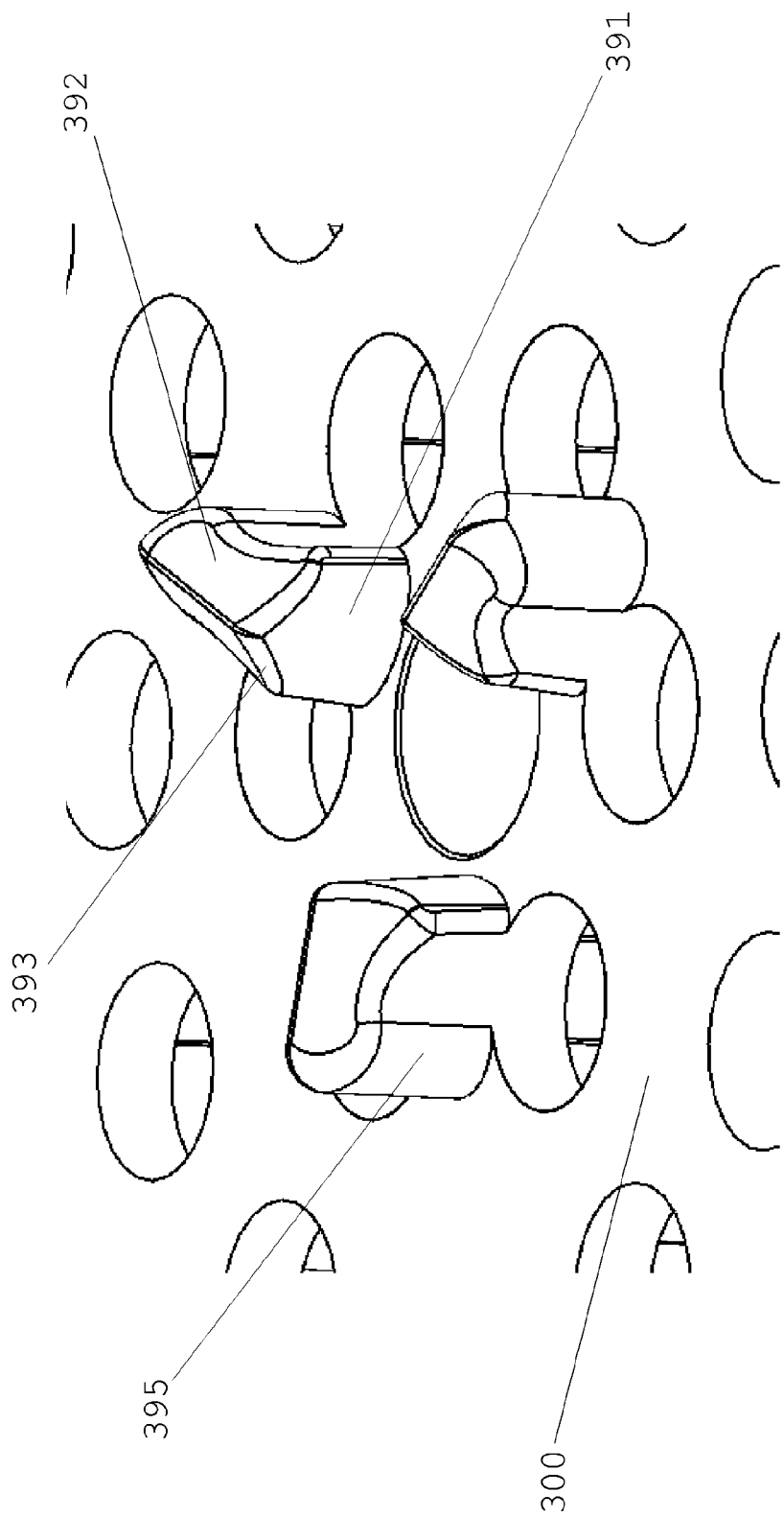
FIG. 18C is an enlarged perspective view of angular guides on a central body of the grinding apparatus shown in FIG. 17.
Figure 18D:
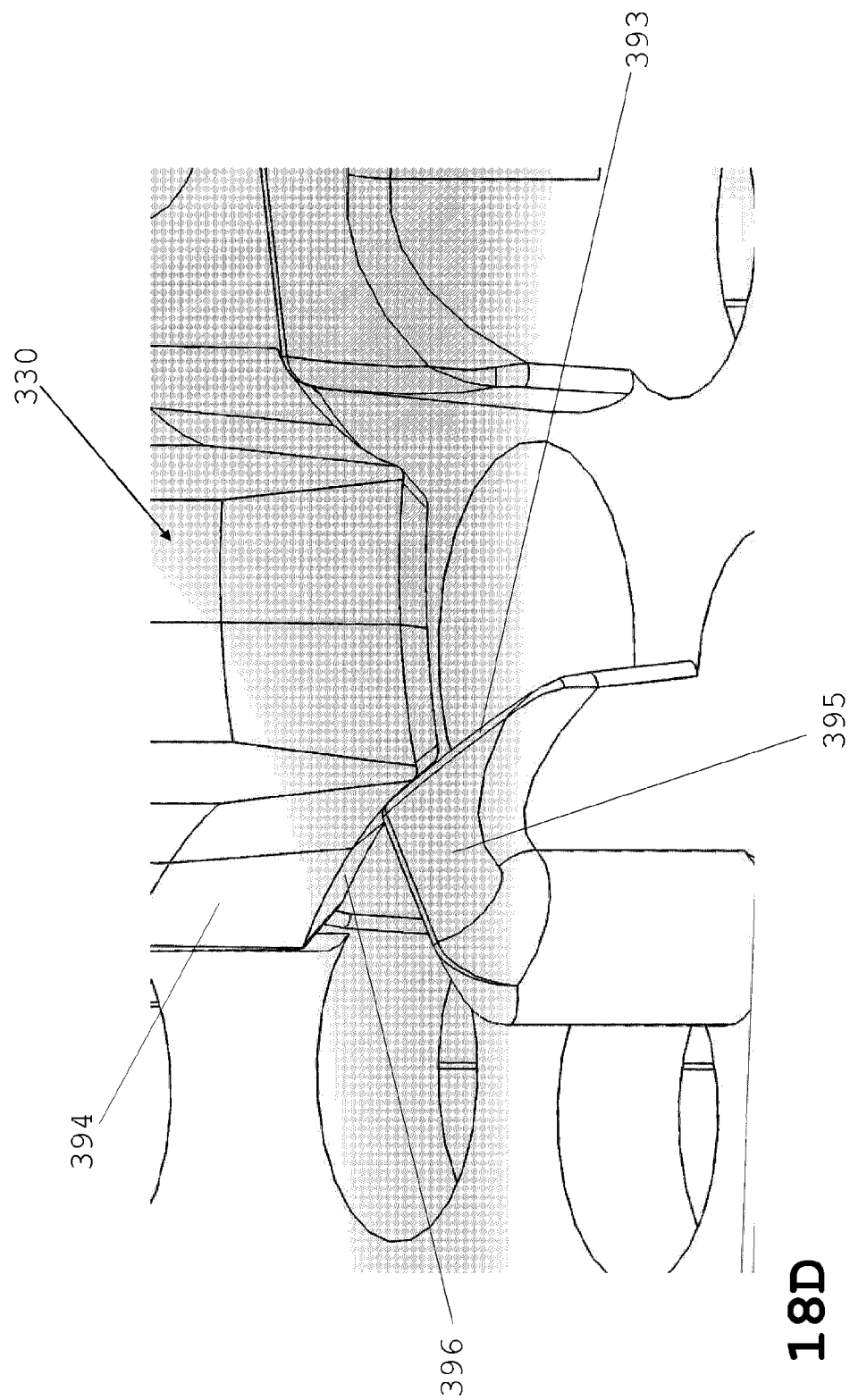
FIG. 18D is an enlarged perspective view of the angular guides abutting a locking member of the grinding apparatus shown in FIG. 17.
Figure 19:
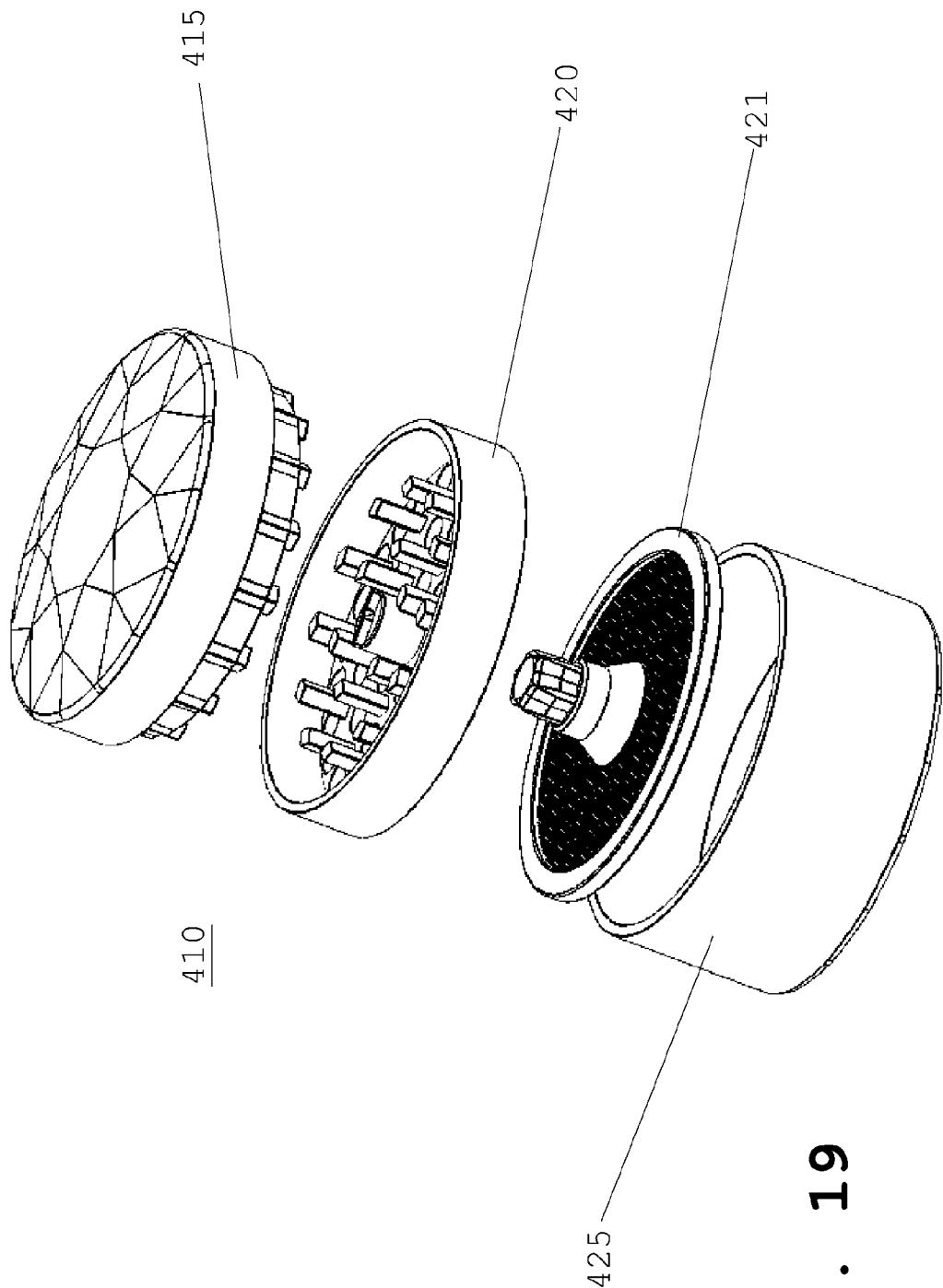
FIG. 19 is an exploded view of a grinding apparatus according to yet another embodiment of the present disclosure.
Figure 20B:
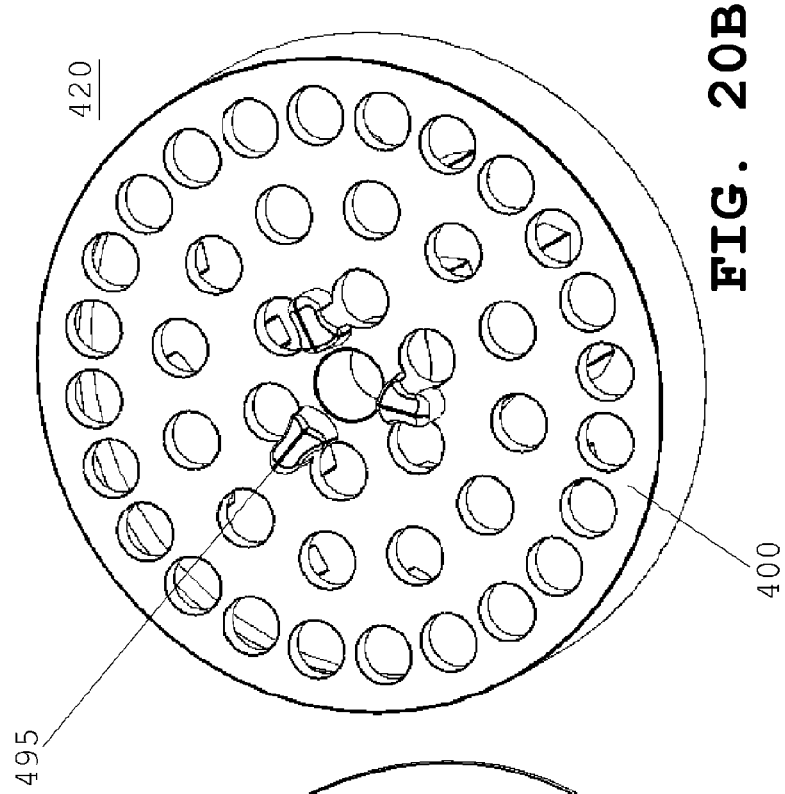
FIG. 20B is a perspective view of a central body of the grinding apparatus shown in FIG. 19.
Figure 20A:
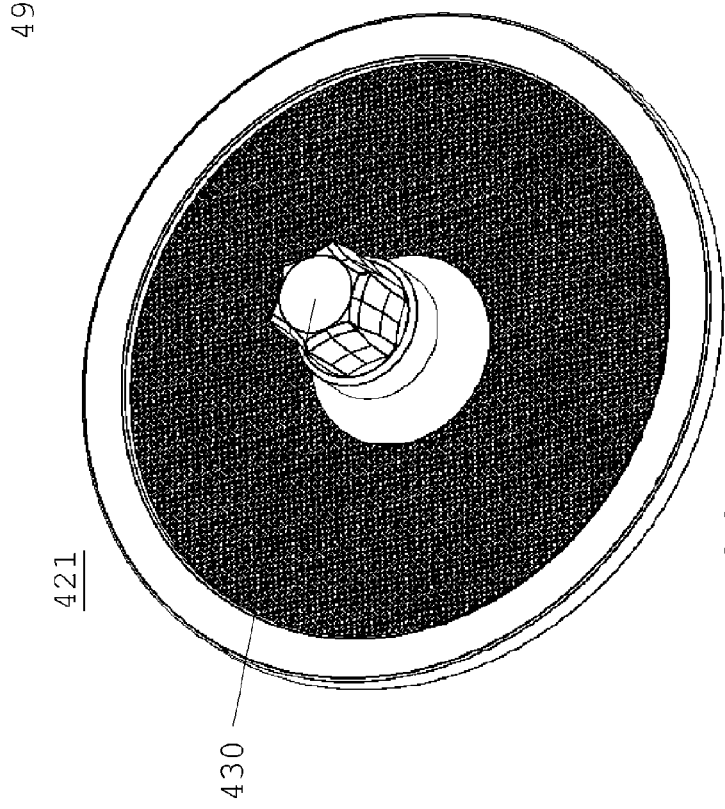
FIG. 20A is an upper perspective view of a mesh screen of the grinding apparatus shown in FIG. 19.

With specific reference to FIG. 18D, the angular guides 395 are shown making initial contact with the locking member 330. Upon initial contact, the rounded edges 393 of the angular guides 395 will contact the tapered rim 396 of the locking member 330. Such contact facilitates a sliding motion between the angular guides 395 and the locking member 330 to in turn facilitate the locking between the upper and lower bodies (not shown).

With reference to FIGS. 19, 20A, 20B, 21A and 21B and according to yet another embodiment of the present disclosure, a grinding apparatus 410 is shown generally comprised of an upper body 415, central body 420, lower body 425 and mesh screen 421. The central body 420 is further comprised of angular guides 495 protruding outwardly from a lower surface 400 of the central body 420 to connect to a locking member 430 of the mesh screen 421. The angular guides 495 are identical to the angular guides 395 shown in FIGS. 18B and 18C, whereas the locking member 430 is identical to the locking member 330 shown in FIG. 18A. The angular guides 495 shown provide an improved connection by greatly reducing the camming out and backlash between the central body 420 and the mesh screen 421. The mesh screen 421 is further comprised of at least three teeth 442 to contact and connect to a star-shaped member 445 of the lower body 425.

The teeth 442 are further comprised of contact walls 443 and tapered front surfaces 444 to facilitate and improve the connection between the mesh screen 421 and the lower body 425. Indeed, the star-shaped member 445 is further comprised of a tapered rim 446. When the mesh screen is positioned inside of the lower body 425, the tapered rim 446 of the star-shaped member 445 initially contacts the contact walls 443 of the teeth 442. These surfaces will slide on each other and force the teeth 442 of the mesh screen 421 in the appropriate position relative to the star-shaped member 445. A worker skilled in the art would appreciate that the optimal connection is for the teeth 442 to be positioned in between adjacent tips, also referred to as radial protrusions 447 of the star-shaped member 445 to prevent rotation of the mesh screen 421 independently from the lower body 425.

Figure 22:
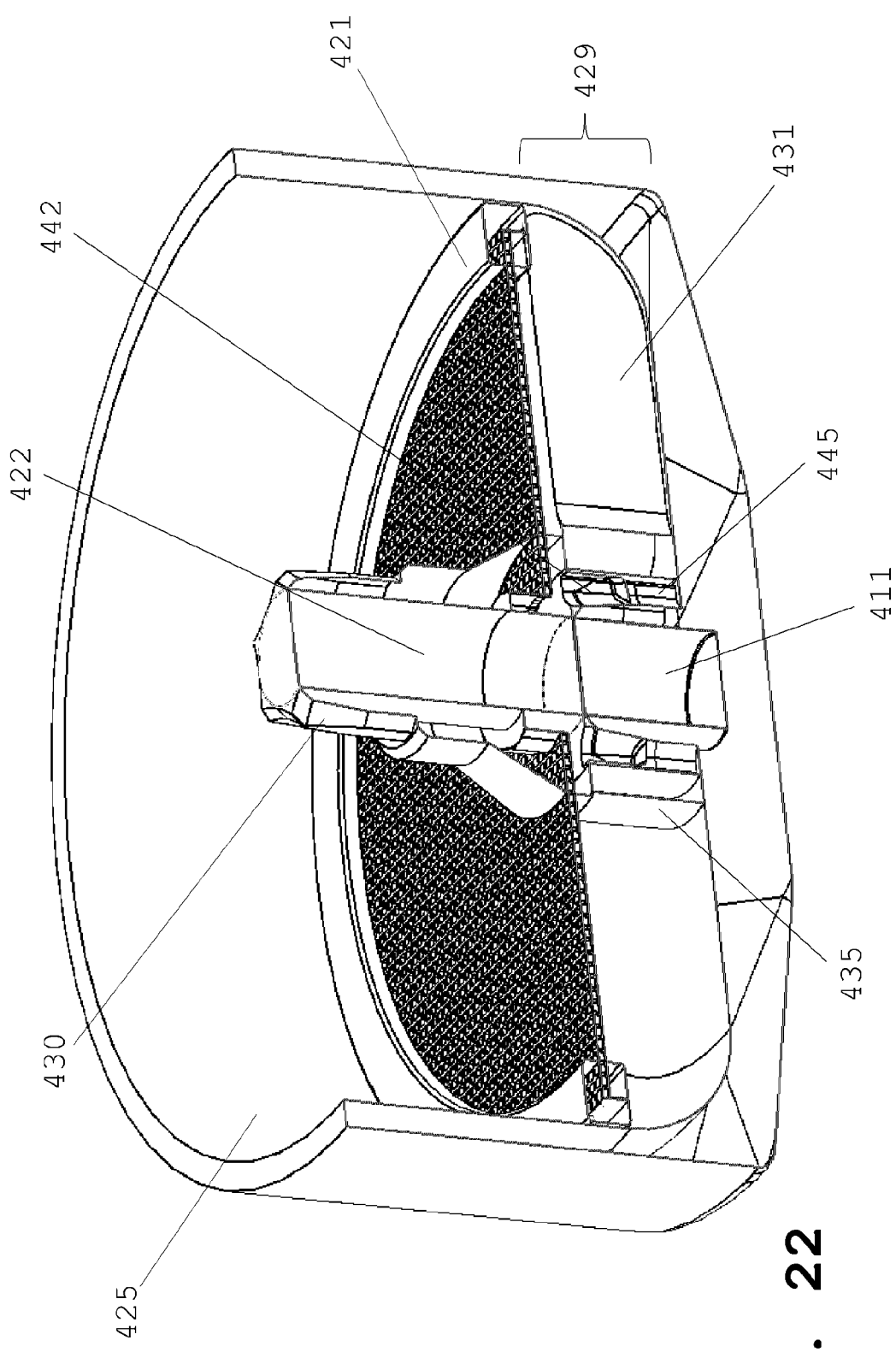
FIG. 22 is a perspective cross-sectional view of the mesh screen inserted within and connected to the lower body of the grinding apparatus shown in FIG. 19.
Figure 23:
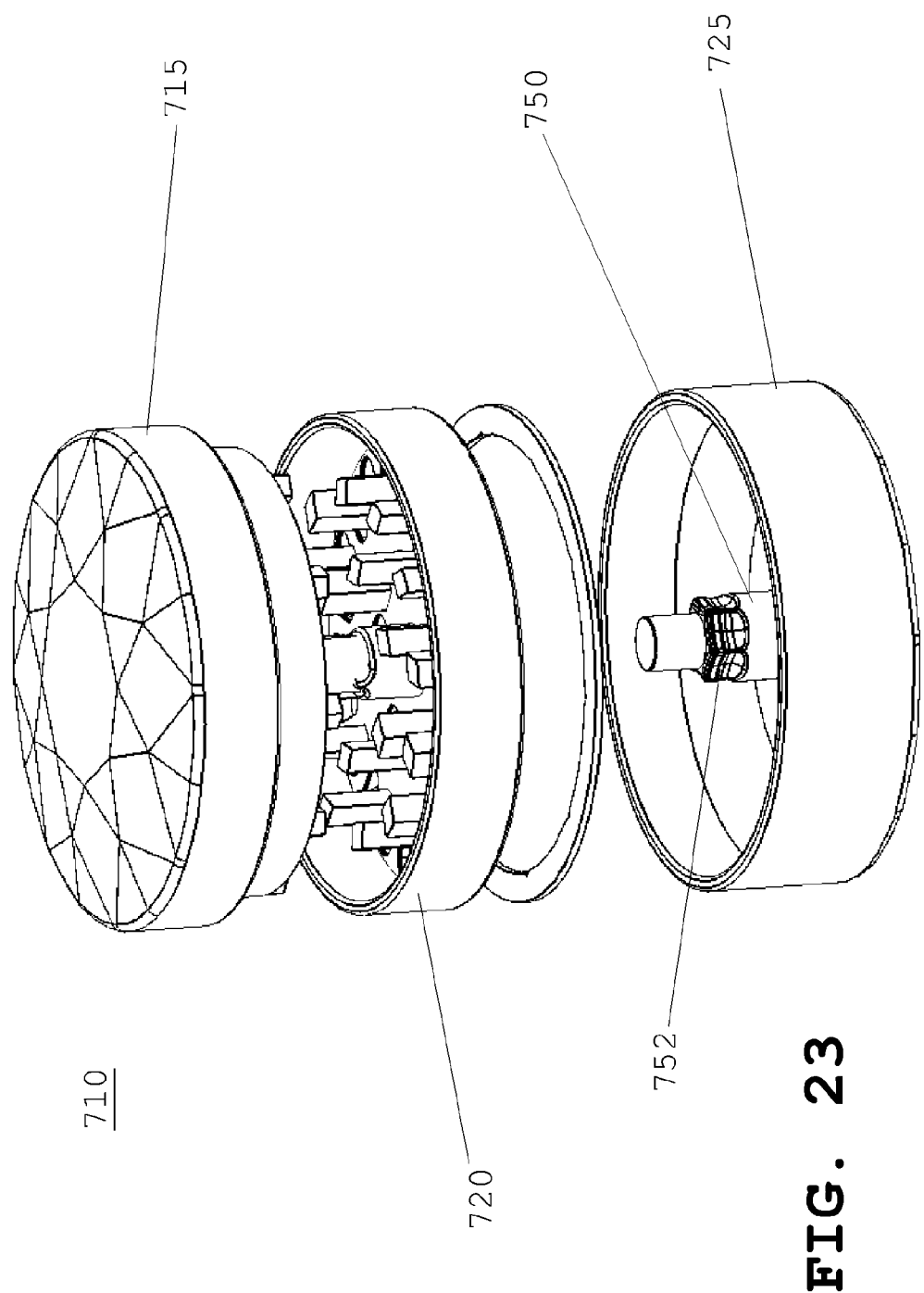
FIG. 23 is an exploded view of a grinding apparatus according to another embodiment of the present disclosure.
Figure 24:
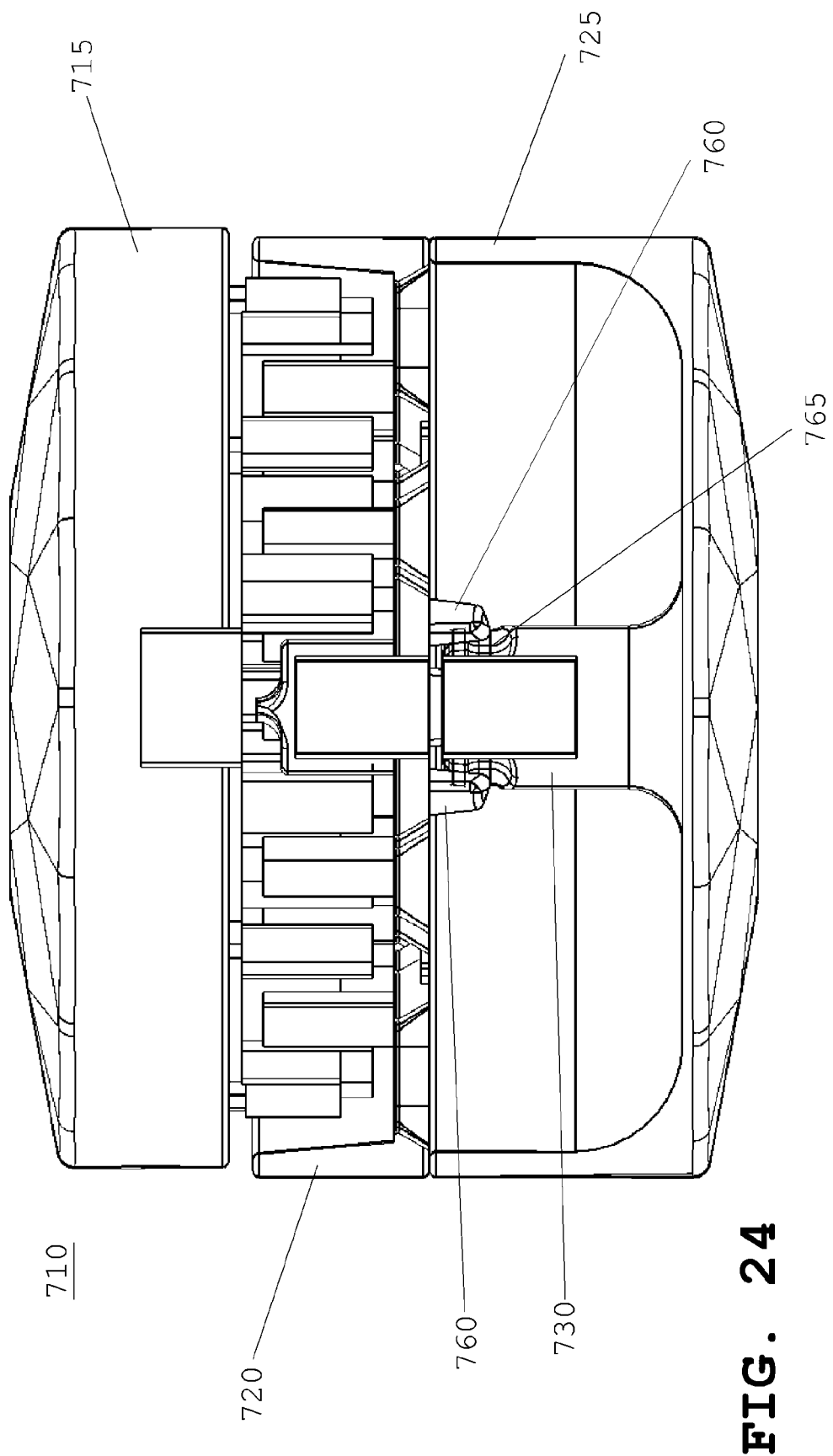
FIG. 24 is a front cross-sectional view of the grinding apparatus shown in FIG. 23.
Figure 25:
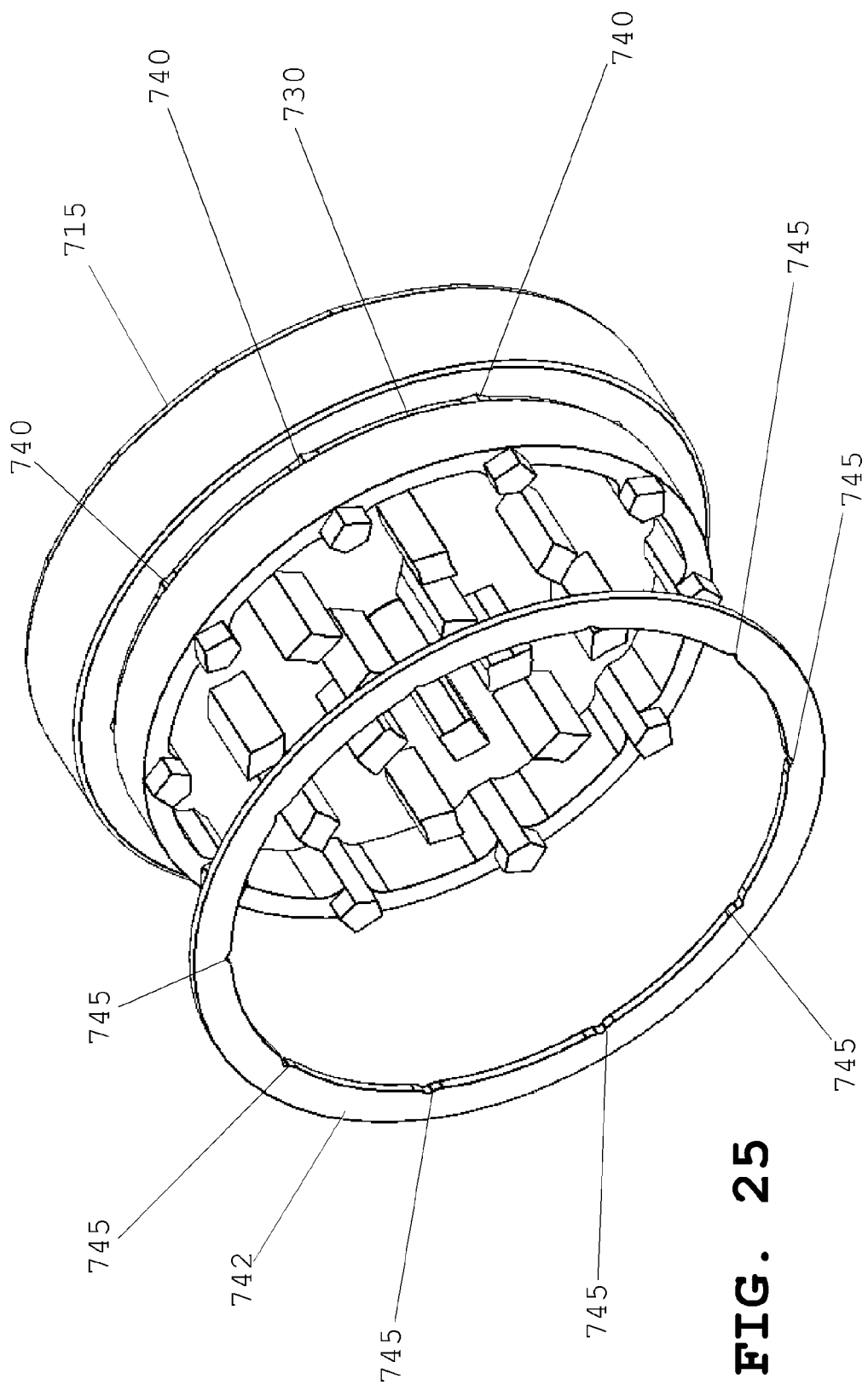
FIG. 25 is an exploded view of the upper body and washer of the grinding apparatus shown in FIG. 23.
Figure 26:
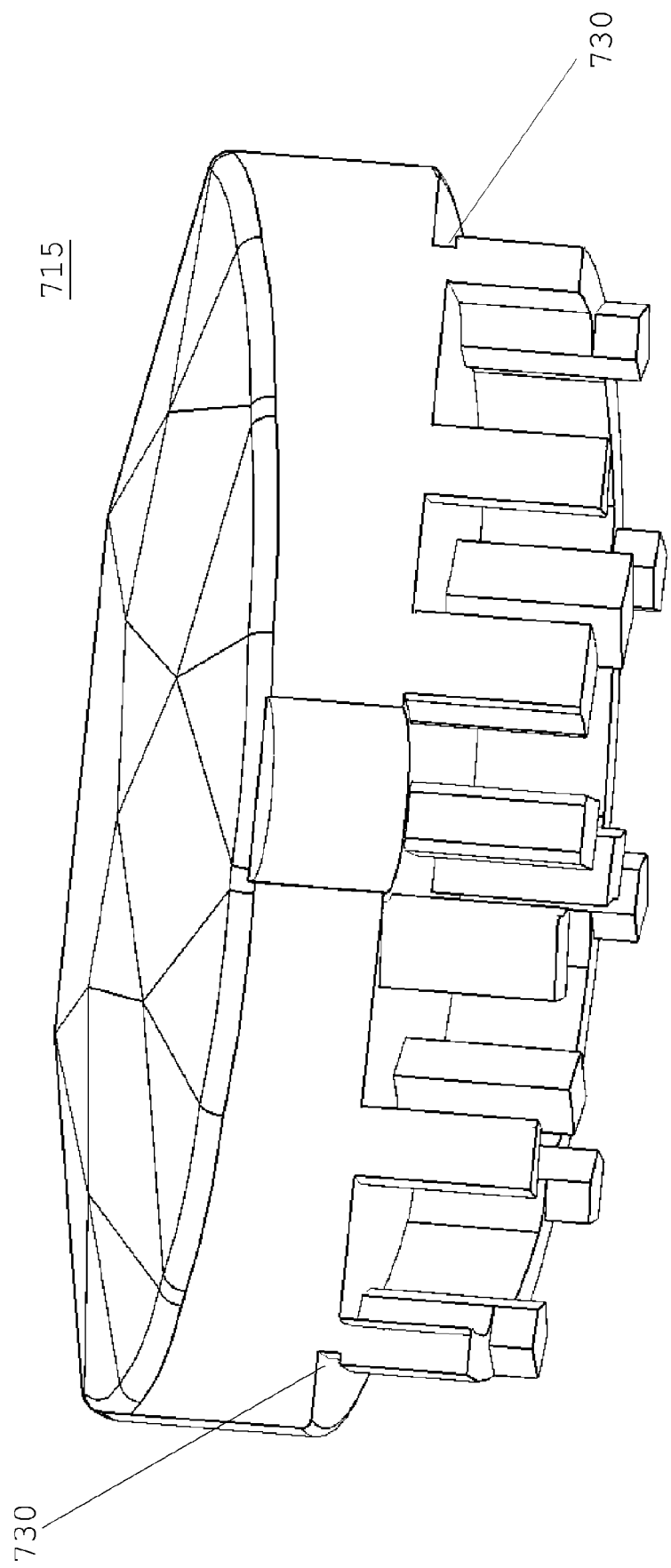
FIG. 26 is a perspective cross-sectional view of the upper body of the grinding apparatus shown in FIG. 23.
Figure 27:
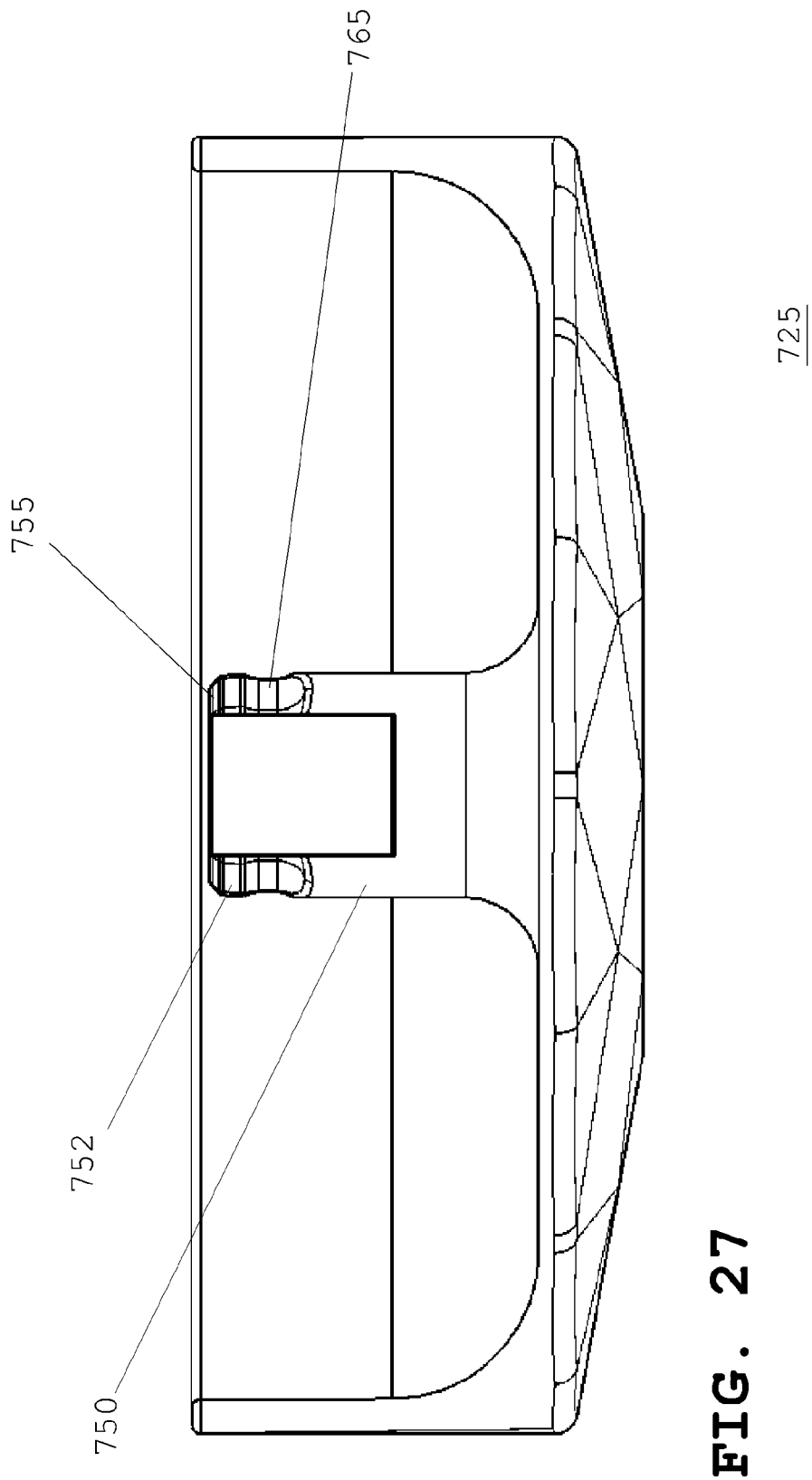
FIG. 27 is a front cross-sectional view of the lower body of the grinding apparatus shown in FIG. 23.

With reference to FIG. 22 and according to an embodiment of the present disclosure, the mesh screen 421 is shown inserted within and connected to the lower body 425. The mesh screen 421 is further comprised of mesh magnet 422 that is substantially surrounded by the locking member 430. A worker skilled in the art would appreciate that the mesh magnet 422 interacts with a lower magnet 411, which is substantially surrounded by the star-shaped member 445, to auto-connect the mesh screen 421 to the lower body 425 in the manner described for FIGS. 21A and 21B above. Indeed, when the mesh screen 421 is axially aligned with and inserted within the lower body 425, the teeth 442 of the mesh screen approach and contact the star-shaped member 445 of the lower body 425. The magnetic force between the mesh magnet 422 and the lower magnet 411 acts to auto-lock to the mesh screen 421 within the lower body 425 by forcing the teeth 442 in between adjacent tips (not shown) of the star-shaped member 445. A scraper 429 is also present, further comprised of a sweeper portion 431 and a ring portion 435. A worker skilled in the art would appreciate that the ring portion 435 of the scraper 429 must substantially surround both the star-shaped member 445 and the teeth 442 when the mesh screen is completely inserted within and secured to the lower body 425.

Figure 28:
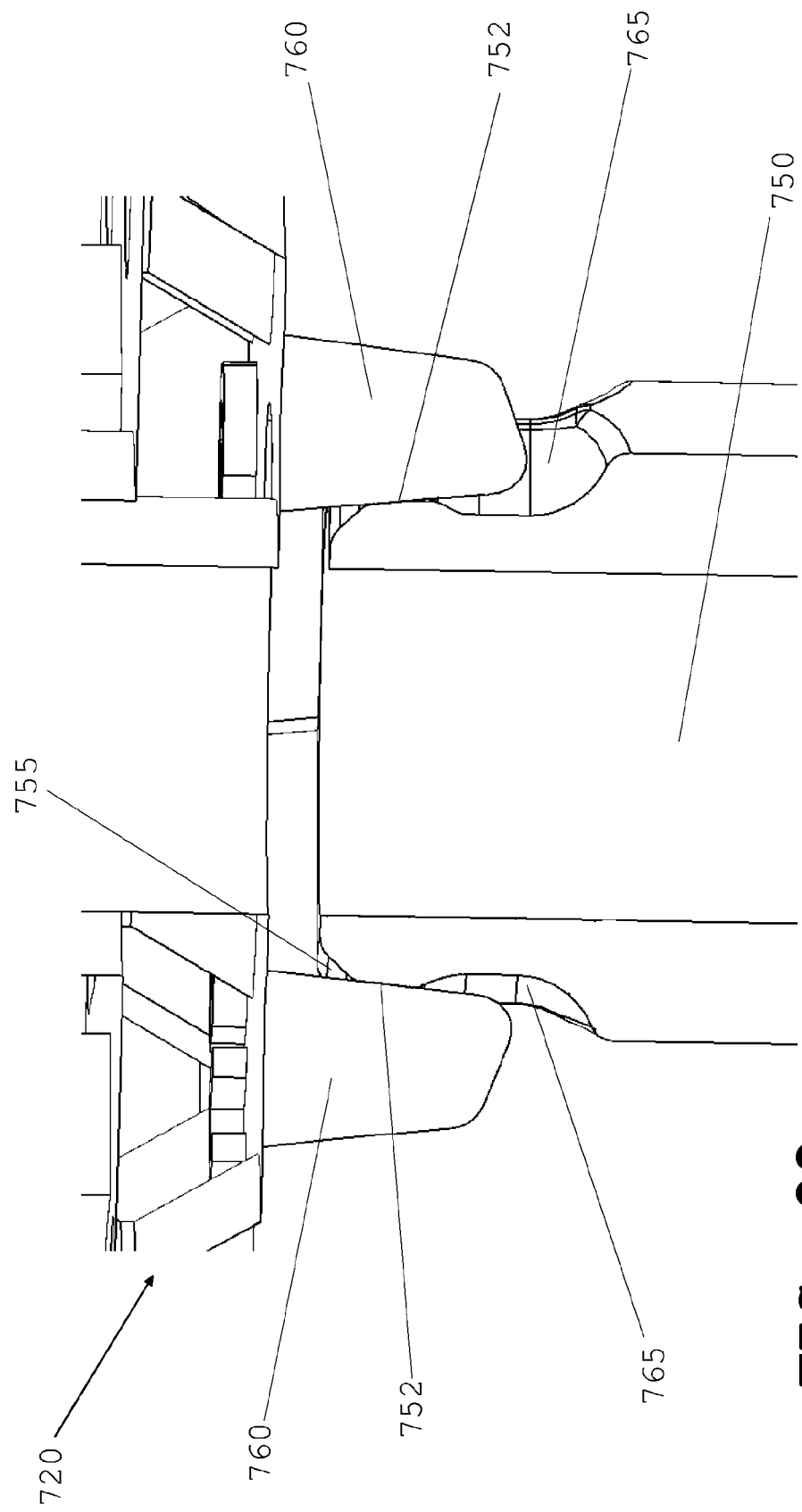
FIG. 28 is an enlarged cross-sectional view of the connection between the central body and lower body of the grinding apparatus shown in FIG. 23; and, FIG. 29 is a perspective view of the central body of the grinding apparatus shown in FIG. 23.
Figure 29:
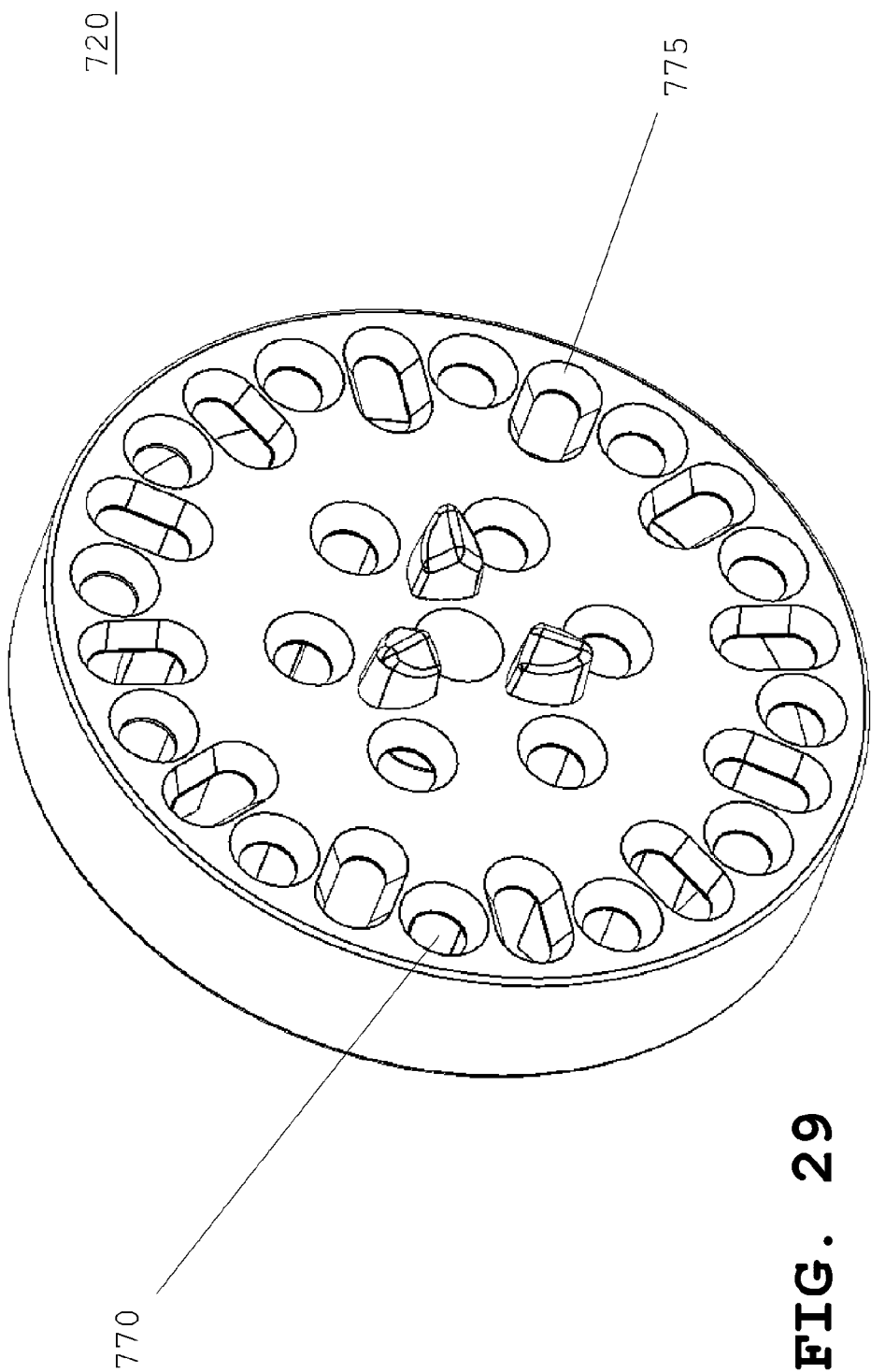

With reference to FIGS. 23, 24, 25, 26, 27, 28 and 29 and according to another embodiment of the present disclosure, a grinding apparatus 710 is shown generally comprised of an upper body 715, central body 720 and lower body 725. In this embodiment, the upper body 715 is further comprised of an annular undercut 730 to retain a washer 742. To prevent the washer 742 from unwanted rotation within the annual undercut 730, the upper body 715 is further comprised of a plurality of protruding spikes 740. The protruding spikes 740 are aligned to fit snugly within indentations 745 of the washer 742 and therefore prevent the washer 742 from rotating independently from the upper body 715. Meanwhile, the lower body 725 is further comprised of a locking member 750, the locking member 750 extending upwardly from the center of the lower body 725. The locking member 750 is further comprised of a tapered rim 755 to facilitate the initial contact with angular guides 760 of the central body 720. The locking member 750 is also comprised of a plurality of grooves 752, each of the grooves 752 having a depression 765 designed to reduce the surface area between the locking member 750 and the angular guides 760, as best shown in FIG. 28. The central body 720 has evacuating apertures 770, the evacuating apertures 770 having a bevel 775 positioned on the underside thereof to accelerate the flow through of herbs from the central body 720 and into the lower body 725.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A grinding apparatus to grind herbs comprising:
   an upper body comprising upper grinding teeth;
   a central body axially aligned with and rotatably connected to the upper body, the central body further comprising:
      central grinding teeth cooperating with the upper grinding teeth to grind the herbs;
      at least three angular guides, each one of the at least three angular guides spaced apart from one another; and,
      at least one evacuating aperture; and,
   a lower body axially aligned with and secured to the central body, the lower body further comprised of:
      a cavity to receive the herbs; and,
      a locking member to engage the at least three angular guides of the central body and provide the proper axial alignment between the lower body and the central body,
   wherein the upper body is in magnetic engagement with and can be rotated independently from the central body and the central body in magnetic engagement to the lower body.

2. The grinding apparatus of claim 1 further comprising a low-friction washer positioned on and secured to a rim of the upper body to provide a seal and reduce wear and tear between the upper body and the central body during operation of the grinding apparatus, the low friction washer further comprising at least one indentation,
   wherein the upper body is further comprised of an annular undercut to retain the low-friction washer, the annular undercut further comprising at least one protruding spike to fit within the at least one indentation.

3. The grinding apparatus of claim 1 wherein the upper grinding teeth are further comprised of outer grinding teeth, central grinding teeth and inner grinding teeth, the outer grinding teeth positioned proximate an outer edge of the upper body to grind the herbs trapped in between the outer grinding teeth and a circular peripheral wall of the central body.

4. The grinding apparatus of claim 3 wherein the circular peripheral wall is further comprised of a sloping inner surface to guide the herbs into a narrower space.

5. The grinding apparatus of claim 1 wherein the at least one evacuating aperture is further comprised of a bevel to accelerate a flow through of the herbs from the central body and into the lower body.

6. The grinding apparatus of claim 1 wherein the locking member projects upwardly and away from a center of the cavity of the lower body, the locking member further comprising a tapered rim to facilitate contact with the at least three angular guides,
   wherein each of the at least three angular guides is further comprised of an outer wall and at least two tapered edges separated by a rounded edge, the rounded edge positioned at an upper end of the at least three angular guides and tapering inwardly towards a center of the grinding apparatus to make initial contact with the tapered rim of the locking member and guide the locking member in between the at least three angular guides and towards the center of the grinding apparatus.

7. The grinding apparatus of claim 6 wherein the locking member is further comprised of projections extending along a length of the locking member, the projections configured to fit in between the at least three angular guides.

8. The grinding apparatus of claim 1 wherein the locking member is further comprised at least one depression to reduce a surface area between the locking member and the at least three angular guides.

9. The grinding apparatus of claim 1 wherein each of the at least three angular guides extend from the central body toward the locking member of the lower body to facilitate initial contact with each other.

10. A grinding apparatus to grind herbs comprising:
an upper body comprising:
 a central inner surface; and,
 upper grinding teeth projecting from the central inner surface, the upper grinding teeth having inner grinding teeth, the inner grinding teeth further comprising concave inner faces surrounding and facing a center of the grinding apparatus;
a central body axially aligned with and rotatably connected to the upper body, the central body further comprising:
 central grinding teeth cooperating with the upper grinding teeth to grind the herbs;
 angular guides;
 at least one evacuating aperture; and,
 cutting edges projecting upwardly and configured to contact the central inner surface of the upper body to cut and grind the herbs positioned on the central inner surface when the central body is secured to the upper body; and,
a lower body axially aligned with and secured to the central body, the lower body further comprised of:
 a cavity to receive the herbs; and,
 a locking member to engage the angular guides of the central body and provide the proper axial alignment between the lower body and the central body,
wherein the upper body is in magnetic engagement with and can be rotated independently from the central body and the central body in magnetic engagement to the lower body
and wherein each of the curved inner faces are configured to surround the cylindrical member of a central body to maintain the axial alignment between the upper body and the central body.

11. The grinding apparatus of claim 10 wherein the cutting edges project upwardly from a top surface of the cylindrical member toward the central inner surface of the upper body.

12. The grinding apparatus of claim 11 wherein the upper grinding teeth are further comprised of outer grinding teeth and central grinding teeth, the outer grinding teeth positioned proximate an outer edge of the upper body to grind the herbs trapped in between the outer grinding teeth and a circular peripheral wall of the central body.

13. The grinding apparatus of claim 12 wherein the circular peripheral wall is further comprised of a sloping inner surface to guide the herbs into a narrower space.

14. The grinding apparatus of claim 10 further comprising a low-friction washer positioned on and secured to a rim of the upper body to provide a seal and reduce wear and tear between the upper body and the central body during operation of the grinding apparatus, the low friction washer further comprising at least one indentation,
wherein the upper body is further comprised of an annular undercut to retain the low-friction washer, the annular undercut further comprising at least one protruding spike to fit within the at least one indentation.

15. The grinding apparatus of claim 10 wherein the at least one evacuating aperture is further comprised of a bevel to accelerate a flow through of the herbs from the central body and into the lower body.

16. The grinding apparatus of claim 10 wherein the locking member projects upwardly and away from a center of the cavity of the lower body, the locking member further comprising a tapered rim to facilitate contact with the angular guides,
wherein each of the angular guides is further comprised of a rounded edge to make initial contact with the tapered rim of the locking member.

17. The grinding apparatus of claim 16 wherein the locking member is further comprised of projections extending axially along a length of the locking member, the projections configured to fit in between the angular guides.

18. The grinding apparatus of claim 10 wherein the locking member is further comprised at least one depression to reduce a surface area between the locking member and the angular guides.

19. A grinding apparatus to grind herbs comprising:
an upper body comprising:
 an inner surface;
 upper grinding teeth projecting from the inner surface, the upper grinding teeth having inner grinding teeth, the inner grinding teeth further comprising concave inner faces surrounding and facing a center of the grinding apparatus;
a central body axially aligned with and rotatably connected to the upper body, the central body further comprising:
 central grinding teeth cooperating with the upper grinding teeth to grind the herbs;
 a cylindrical member;
 angular guides; and,
 at least one evacuating aperture; and,
a lower body axially aligned with and secured to the central body, the lower body further comprised of:
 a cavity to receive the herbs; and,
 a locking member to engage the angular guides of the central body and provide the proper axial alignment between the lower body and the central body,
wherein the upper body is in magnetic engagement with and can be rotated independently from the central body and the central body in magnetic engagement to the lower body,
and wherein each of the curved inner faces are configured to surround the cylindrical member of the central body to maintain the axial alignment between the upper body and the central body.

20. The grinding apparatus of claim 19 wherein a gap is provided between the concave inner faces of the inner grinding teeth and the cylindrical member of the central body, the gap to allow a maximum radial movement between the upper body and the central body, the maximum radial movement equal to a width of the gap.

* * * * *